United States Patent
Yusuf et al.

(10) Patent No.: US 11,928,847 B2
(45) Date of Patent: Mar. 12, 2024

(54) METHOD AND APPARATUS OF AUTHENTICATING DOCUMENTS HAVING EMBEDDED LANDMARKS

(71) Applicant: ELM COMPANY, Riyadh (SA)

(72) Inventors: Syed Adnan Yusuf, Riyadh (SA); Abdulmalik Ali Aldawsari, Riyadh (SA); Riad Souissi, Riyadh (SA)

(73) Assignee: ELM COMPANY, Riyadh (SA)

( * ) Notice: Subject to any disclaimer, the term of this patent is extended or adjusted under 35 U.S.C. 154(b) by 235 days.

(21) Appl. No.: 17/716,377

(22) Filed: Apr. 8, 2022

(65) Prior Publication Data

US 2023/0143239 A1    May 11, 2023

Related U.S. Application Data

(60) Provisional application No. 63/278,176, filed on Nov. 11, 2021.

(51) Int. Cl.
| | | |
|---|---|---|
| *G06V 10/00* | (2022.01) | |
| *G06V 10/145* | (2022.01) | |
| *G06V 10/22* | (2022.01) | |
| *G06V 10/774* | (2022.01) | |
| *G06V 30/413* | (2022.01) | |

(52) U.S. Cl.
CPC .......... *G06V 10/145* (2022.01); *G06V 10/225* (2022.01); *G06V 10/774* (2022.01); *G06V 30/413* (2022.01)

(58) Field of Classification Search
CPC .... G06V 10/225; G06V 30/40; G06V 30/413; G06V 10/751; G06V 10/145; G06V 10/774; G06V 20/95; G06Q 50/265
See application file for complete search history.

(56) References Cited

U.S. PATENT DOCUMENTS

| | | | |
|---|---|---|---|
| 9,038,907 B1* | 5/2015 | Lebaschi | H04N 1/00005 |
| | | | 235/449 |
| 9,171,347 B2 | 10/2015 | Caton et al. | |
| 2018/0005027 A1* | 1/2018 | Touret | G06V 30/40 |

FOREIGN PATENT DOCUMENTS

JP    2003248802 A    9/2003

\* cited by examiner

*Primary Examiner* — Molly Wilburn
*Assistant Examiner* — Ahmed A Nasher
(74) *Attorney, Agent, or Firm* — NKL Law; Allen Xue

(57) ABSTRACT

Provided are computer-implemented technologies of authenticating documents. The technologies use a set of photo images (or videos), taken under a certain illumination condition and from a set of distinct tilting angles, on one or more security/ID features of one or more documents of a document genre whose authenticity is ascertained, to train an Artificial Intelligence (AI) machine learning program to build a learned model. The learned model, through the said training, attains a set of angular responses of the document genre under the illumination condition which encode a set of descriptive information about each of the one or more security/ID features of the document genre under the illumination condition. The learned model, then, is applied to authenticate, one by one, a number of target documents of the document genre whose authenticity is unknown and to be determined.

21 Claims, 13 Drawing Sheets

METHOD AND APPARATUS OF AUTHENTICATING DOCUMENTS HAVING EMBEDDED LANDMARKS

RELATED APPLICATIONS

This application claims the benefit of priority under 35 U.S.C. § 119 to U.S. Provisional Application No. 63/278,176, filed on Nov. 11, 2021, the entire contents of which are incorporated herein by reference.

BACKGROUND

1. Field of Technology

The present invention relates to the field of document authentication. Specifically, the present method and/or system relates to authenticating identification documents such as passports, national identity cards, or driver's licenses, or even bank notes, which usually contain embedded watermarks, fonts, logos and holographic impressions, and which are often subjected to forgery.

2. Description of Related Art

Identification documents with watermarks are commonly used to identify individuals or entities for a wide range of purposes ranging from immigration control to access controlled facilities such as car hires, healthcare access, and other government services. The repercussions of unauthorized access to such facilities via forged documents is generally phenomenal leading criminal prosecutions not only for the bearer of such documents but also for authorities that failed to identify such documents.

The authenticity of many identification documents such as passports or national identity cards is ascertained by reviewing the embedded security features. These features may contain embedded watermarks, fonts, logos and holographic impressions. It is the duty of the evaluating officer to make sure all such security features are processed verified error.

The identification documents authentication relates to systems for capturing, analyzing and authenticating identity documents and/or images particularly the systems and methods that relate to embedded/hidden features that are only visible under certain illumination and/or angular assessment of the said document (i.e., assessing the said document by examining it from a particular angle).

There are several prior arts in the field, and they all have one or more weakness in meeting the challenges in the field. For example, in the US patent (U.S. Pat. No. 9,171,347B2) which claims a system and method for analysis and authentication of covert security information using a smart device, the system therein is primarily meant to detect at least one, hidden security feature where the camera captures the preview image. The capture application adjusts the focus of the camera. However, this system is incapable to identify fluorescent ink based hidden patterns which are only visible at certain parts of the documents.

For another instance, in the Japanese patent application (JP2003248802A), which claims device and system for automatically detecting passport forgery, the document authenticator mechanism therein also utilizes infrared and ultraviolet light. The system therein, however, is primarily and narrowly reliant on specialized illumination mechanisms (ultraviolet/infrared) to identify hidden watermark/fluorescent features, and it does not employ learnt intelligence to identify and differentiate a plurality of similar documents for forgeries based on the embedded watermarking features therein.

At best, the prior art methods and/or systems have limited capability in one way or the other, and as the result, they lag behind in successful rate in capturing forgeries in identification documents. Therefore, there is a need for improved technologies that result in high successful rate in capturing forgeries in identification documents.

SUMMARY OF THE DESCRIPTION

Provided is a computer-implemented method of authenticating documents comprising: (a). capturing, sequentially at a first set of placement angles that are different from each other, a first set of photo images of one or more security features of a known authentic document that is placed under an illumination condition, and wherein the one or more security features, when illuminated, are visible, partially or fully, at the first set of placement angles; (b). for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features; (d). capturing, sequentially at a second set of placement angles that are different from each other a second set of photo images of a security feature of a first unknown document that is placed under the illumination condition, and wherein the first unknown document is of the document genre and whose authenticity is to be determined; (e). for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; (f). determining the authenticity of the first unknown document by applying the learned model on the second set of photo images and the second set of estimated angles, wherein the applying the model at least involves comparing a piece of descriptive information about the security feature of the first unknown document that is encoded in the learned model as a part of the set of document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another computer-implemented method of authenticating documents that extends the method described in the previous paragraph by further comprising: (g). capturing, sequentially at a third set of placement angles which are different from each other, a third set of photo images of a security feature of a second unknown document that is placed under the illumination condition, wherein the second unknown document is of the document genre and whose authenticity is to be determined; (h). for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images; (i). determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is another computer-implemented method of authenticating documents, comprising: (a). capturing, sequentially at a first set of placement angles that are different from each other, a first set of photo images of one or more security features of a known authentic document that is placed under an illumination condition, wherein the known authentic document is of a document genre, and wherein the one or more security features, when illuminated, are visible, partially or fully, at the first set of placement angles; (b). for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to the values of the first set of estimated angles; (e). storing the second set of placement angles along with and in association with the second set of photo images; (f). determining the authenticity of the first unknown document by applying the learned model on the second set of images and the second set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another computer-implemented method of authenticating documents that expends the method described in the previous paragraph by comprising: (g). capturing, sequentially at a third set of placement angles which are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles; (h). storing the third set of placement angles along with and in association with the third set of photo images; (i). determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is another computer-implemented method of authenticating documents, comprising: (a). retrieving, from a database, a first set of photo images of one or more security features of one or more known authentic documents of a document genre, wherein the first set of photo images are pre-captured, sequentially at a first set of placement angles that are different from each other, on the one or more security features of the one or more known authentic documents that are placed under an illumination condition, wherein the one or more security features, when illuminated, are visible, partially or fully, at the first set of placement angles; (b). for each of the first set of photo images, estimating, by using a computer-implemented machine learning algorithm, an angle of the one or more known authentic documents being held when the photo image was captured, and aggregating the estimated angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contain the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined; (e). for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; (f). determining the authenticity of the first unknown document by applying the learned model on the second set of images and the second set of estimated angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another computer-implemented method for authenticating documents that extends the method described in the previous paragraph by comprising: (g). capturing, sequentially at a third set of placement angles that are different from each other, a third set of photo images of a security feature of a second unknown document, wherein the second unknown document is of the document genre and whose authenticity is to be determined, and wherein the security feature of the second unknown document is illuminated under the illumination condition; (h). for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images; (i). determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is a yet another computer-implemented method for authenticating documents, comprising: (a). retrieving, from a database, a first set of photo images of one or more security features of one or more known authentic documents of a document genre, wherein the first set of photo images are pre-captured, sequentially at a first set of placement angles that are different from each other, on the one or more security features of the one or more known authentic documents that were placed under an illumination condition, wherein the one or more security features, when illuminated, are visible, partially or fully, under the illumination condition; (b). for each of the first set of photo images, estimating, by using a computer-implemented machine learning algorithm, an angle of the one or more known authentic documents being held when the photo image was captured, and aggregating the angle in association with the photo image of the first set of photo images into a first set of estimated angles, and storing the first set of estimation angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document type under the illumination condition that contains the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to the values of the first set of estimated angles; (e). storing the second set of placement angles along with and in association with the second set of photo images; (f). determining the authenticity of the first unknown document by applying the learned model on the second set of images and the second set of placement angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another computer-implemented method for authenticating documents that extends the method described in the previous paragraph by further comprising: (g). capturing, sequentially at a third set of placement angles that are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles; (h). storing the third set of placement angles along with and in association with the third set of photo images; (i). determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is a system for authenticating one or more documents, comprising: one or more light sources providing an illumination condition, one or more output devices providing intermediate or final outcome of the authenticating documents and prompting end-user instructions for operating the system, a photographing device taking photo images of the one or more documents under the illumination condition, one or more computer processors, one or more computer-readable memories and one or more computer-readable, tangible storage devices, one or more databases, and computer readable program instructions, stored in at least one of the one or more computer-readable, tangible storage devices for execution by at least one of the one or more computer processors via at least one of the one or more memories, to perform operations, the operations comprising: (a). capturing, sequentially at a first set of placement angles that are different from each other, a first set of photo images of one or more security features of a known authentic document that is placed under an illumination condition, and wherein the one or more security features, when illuminated, are visible, partially or fully, at the first set of placement angles; (b). for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features; (d). capturing, sequentially at a second set of placement angles that are different from each other a second set of photo images of a security feature of a first unknown document that is placed under the illumination condition, and wherein the first unknown document is of the document genre and whose authenticity is to be determined; (e). for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; (f). determining the authenticity of the first unknown document by applying the learned model on the second set of photo images and the second set of estimated angles, wherein the applying the model at least involves comparing a piece of descriptive information about the security feature of the first unknown document that is encoded in the learned model as a part of the set of document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another system for authenticating one or more documents that extends the system described in the previous paragraph by extending the operations therein to comprise: (g). capturing, sequentially at a third set of placement angles which are different from each other, a third set of photo images of a security feature of a second unknown document that is placed under the illumination condition, wherein the second unknown document is of the document genre and whose authenticity is to be determined; (h). for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images; (i). determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is another system for authenticating one or more documents, comprising: one or more light sources providing an illumination condition, one or more output devices providing intermediate or final outcome of the authenticating documents and prompting end-user instructions for operating the system, a photographing device taking photo images of the one or more documents under the illumination condition, one or more computer processors, one or more computer-readable memories and one or more computer-readable, tangible storage devices, one or more databases, and computer readable program instructions, stored in at least one of the one or more computer-readable, tangible storage devices for execution by at least one of the one or more computer processors via at least one of the one or more memories, to perform operations, the operations comprising: (a). capturing, sequentially at a first set of placement angles that are different from each other, a first set of photo images of one or more security features of a known authentic document that is placed under an illumination condition, wherein the known authentic document is of a document genre, and wherein the one or more security features, when illuminated, are visible, partially or fully, at the first set of placement angles; (b). for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to the values of the first set of estimated angles; (e). storing the second set of placement angles along with and in association with the second set of photo images; (f). determining the authenticity of the first unknown document by applying the learned model on the second set of images and the second set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another system for authenticating one or more documents that extends the system described in the previous paragraph by extending the operations therein to comprise: (g). capturing, sequentially at a third set of placement angles which are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles; (h). storing the third set of placement angles along with and in association with the third set of photo images; (i). determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is another system for authenticating one or more documents, comprising: one or more light sources providing an illumination condition, one or more output devices providing intermediate or final outcome of the authenticating documents and prompting end-user instructions for operating the system, a photographing device taking photo images of the one or more documents under the illumination condition, one or more computer processors, one or more computer-readable memories and one or more computer-readable, tangible storage devices, one or more databases, and computer readable program instructions, stored in at least one of the one or more computer-readable, tangible storage devices for execution by at least one of the one or more computer processors via at least one of the one or more memories, to perform operations, the operations comprising: (a). retrieving, from the one or more databases, a first set of photo images of one or more security features of one or more known authentic documents of a document genre, wherein the first set of photo images are pre-captured, sequentially at a first set of placement angles that are different from each other, on the one or more security features of the one or more known authentic documents that are placed under an illumination condition, wherein the one or more security features, when illuminated, are visible, partially or fully, at the first set of placement angles; (b). for each of the first set of photo images, estimating, by using a computer-implemented machine learning algorithm, an angle of the one or more known authentic documents being held when the photo image was captured, and aggregating the estimated angle in association with the photo image of the first set of photo images into a first set of estimated angles, and storing the first set of estimated angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contain the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined; (e). for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; (f). determining the authenticity of the first unknown document by applying the learned model on the second set of images and the second set of estimated angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another system for authenticating one or more documents that extends the system described in the previous paragraph by extending the operations therein to comprise: (g). capturing, sequentially at a third set of placement angles that are different from each other, a third set of photo images of a security feature of a second unknown document, wherein the second unknown document is of the document genre and whose authenticity is to be determined, and wherein the security feature of the second unknown document is illuminated under the illumination condition; (h). for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images; (i). determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

Provided is another system for authenticating one or more documents, comprising: one or more light sources providing an illumination condition, one or more output devices providing intermediate or final outcome of the authenticating documents and prompting end-user instructions for operating the system, a photographing device taking photo images of the one or more documents under the illumination condition, one or more computer processors, one or more computer-readable memories and one or more computer-readable, tangible storage devices, one or more databases, and computer readable program instructions, stored in at least one of the one or more computer-readable, tangible storage devices for execution by at least one of the one or more computer processors via at least one of the one or more memories, to perform operations, the operations comprising: (a). retrieving, from the one or more databases, a first set of photo images of one or more security features of one or more known authentic documents of a document genre, wherein the first set of photo images are pre-captured, sequentially at a first set of placement angles that are different from each other, on the one or more security features of the one or more known authentic documents that were placed under an illumination condition, wherein the one or more security features, when illuminated, are visible, partially or fully, under the illumination condition; (b). for each of the first set of photo images, estimating, by using a computer-implemented machine learning algorithm, an angle of the one or more known authentic documents being held when the photo image was captured, and aggregating the angle in association with the photo image of the first set of photo images into a first set of estimated angles, and storing the first set of estimation angles along with the first set of photo images; (c). training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document type under the illumination condition that contains the at least one piece of descriptive information about each security feature of the one or more security features; (d). capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to the values of the first set of estimated angles; (e). storing the second set of placement angles along with and in association with the second set of photo images; (f). determining the authenticity of the first unknown document by applying the learned model on the second set of images and the second set of placement angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

Provided is another system for authenticating one or more documents that extends the system described in the previous paragraph by extending the operations therein to comprise: (g). capturing, sequentially at a third set of placement angles that are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles; (h). storing the third set of placement angles along with and in association with the third set of photo images; (i). determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

BRIEF DESCRIPTION OF THE DRAWINGS

The present invention is illustrated by way of example and not limited in the figures of the accompanying drawings in which like references indicate similar elements.

DETAILED DESCRIPTION

Various embodiments and aspects of the inventions will be described with reference to details discussed below, and the accompanying drawings will illustrate some embodiments. The following description and drawings are illustrative of the invention and are not to be construed as limiting the scope of the invention. Numerous specific details are described to provide an overall understanding of the present invention to one of ordinary skill in the art.

Reference in the specification to "one embodiment" or "an embodiment" or "another embodiment" means that a particular feature, structure, or characteristic described in conjunction with the embodiment can be included in at least one embodiment of the invention but need not be in all embodiments. The appearances of the phrase "in one embodiment" in various places in the specification do not necessarily all refer to the same embodiment.

Embodiments use a computer system for receiving, storing and analyzing sample documents' images/videos data and for providing information to verify target documents that are in the same genre as the sample documents. The system, in particular, employs artificial intelligence techniques to train a predictive model to verify target documents.

Figure 1:
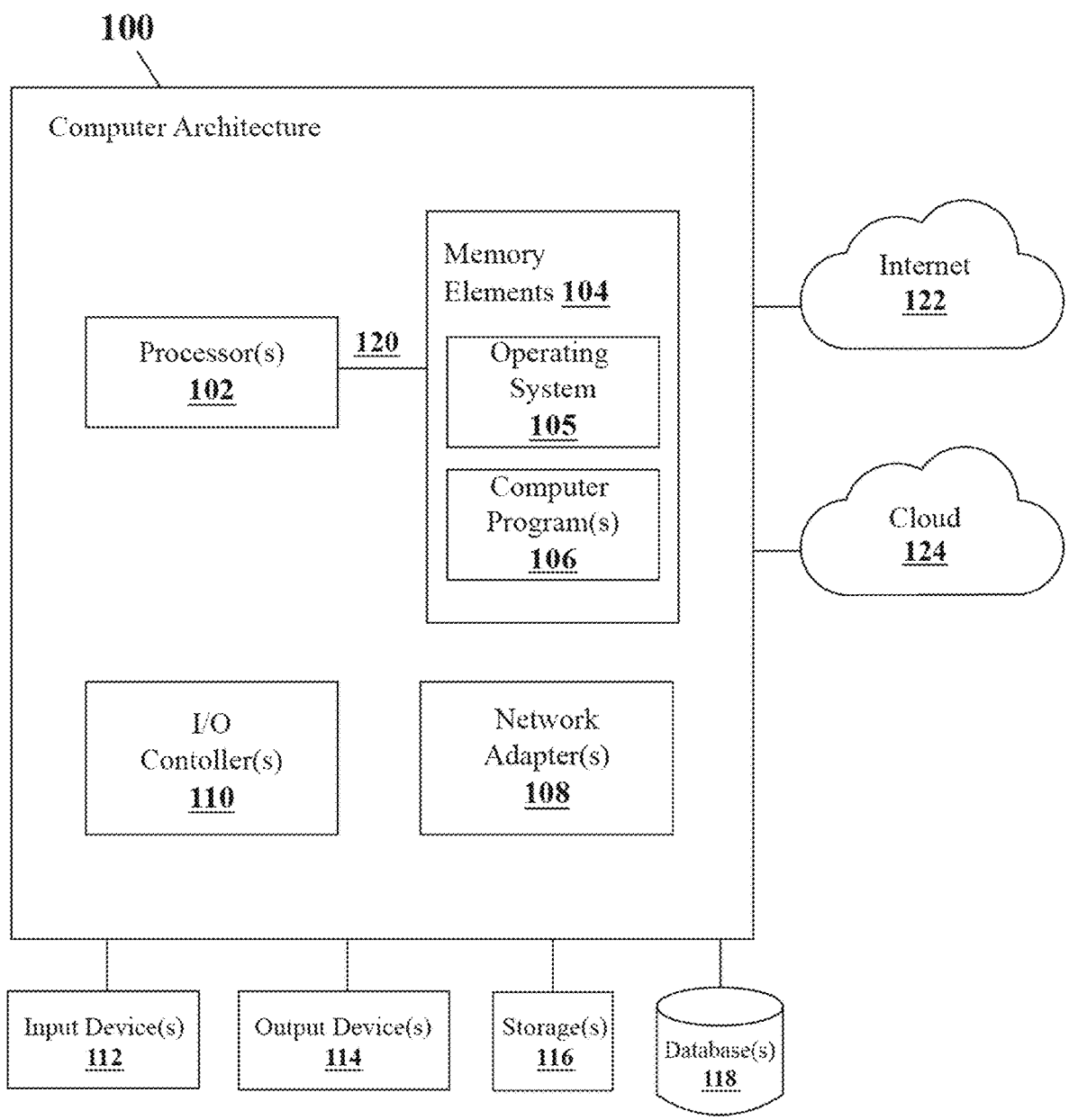
FIG. 1 illustrates, in a schematic block diagram, a computing environment being used in accordance with certain embodiments. The environment, in certain embodiments, may include artificial intelligence (AI) features (not shown, but are implicit in the Computer Programs).

FIG. 1 illustrates a computer architecture 100 that may be used in accordance with certain embodiments. In certain embodiments, the raw sports data collection, storage, and process use computer architecture 100. The computer architecture 100 is suitable for storing and/or executing computer readable program instructions and includes at least one processor 102 coupled directly or indirectly to memory elements 104 through a system bus 120. The memory elements 104 may include one or more local memories employed during actual execution of the program code, bulk storage, and cache memories which provide temporary storage of at least some program code in order to reduce the number of times code must be retrieved from bulk storage during execution. The memory elements 104 include an operating system 105 and one or more computer programs 106, and the operating system 105, as understood by one skilled in the computer art, controls the operation of the entire computer architecture 100 and the architecture 100's interaction with components coupled therewith such as the shown components (input device(s) 112, output device(s) 114, storage(s) 116, databases 118, internet 122, and cloud 124) and unshown components that are understood by one skilled in the art, and the operating system 105 may be switched and changed as fit.

Input/Output (I/O) devices 112, 114 (including but not limited to keyboards, displays, pointing devices, transmitting device, mobile phone, edge device, verbal device such as a microphone driven by voice recognition software or other known equivalent devices, etc.) may be coupled to the system either directly or through intervening I/O controllers 110. More pertinent to the embodiments of disclosure are photographing devices as one genre of input device. A photographing device can be a camera, a mobile phone that is equipped with a camera, a edge device that is equipped with a camera, or any other device that can capture one or more images/videos of an object (or a view) via various means (such as optical means or radio-wave based means), store the captured images/videos in some local storage (such as a memory, a flash disk, or the like), and to transmit the captured images/videos, as input data, to either a more permanent storage (such as a database 118, a storage 116) or the at least one processor 102, depending on the demand of to where the captured images/videos are to be transmitted.

Input Devices 112 receive input data (raw and/or processed), and instructions from a user or other source. Input data includes, inter alia, (i) captured images of documents, (ii) captured videos of documents, and/or (iii) angles between the documents and the surface of the photographing device's optical lens that faces the documents and that is used when capturing the images/videos.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108. Network adapters 108 may also be coupled to internet 122 and/or cloud 124 to access remote computer resources.

The computer architecture 100 may be coupled to storage 116 (e.g., any type of storage device; a non-volatile storage area, such as magnetic disk drives, optical disk drives, a tape drive, etc.). The storage 116 may comprise an internal storage device or an attached or network accessible storage. Computer programs 106 in storage 116 may be loaded into the memory elements 104 and executed by a processor 102 in a manner known in the art.

Computer programs 106 may include AI programs or machine learning programs, and the computer programs 106 may partially reside in storage 116 and partially reside in cloud 124 or internet 122.

The computer architecture 100 may include fewer components than illustrated, additional components not illustrated herein, or some combination of the components illustrated and additional components. The computer architecture 100 may comprise any computing device known in the art, such as a mainframe, server, personal computer, workstation, laptop, handheld computer, telephony device, network appliance, virtualization device, storage controller, virtual machine, smartphone, tablet, etc.

Input device(s) 112 transmits input data to processor(s) 102 via memory elements 104 under the control of operating system 105 and computer program(s) 106. The processor(s) 102 may be central processing units (CPUs) and/or any other types of processing device known in the art. In certain embodiments, the processing devices 102 are capable of receiving and processing input data from multiple users or sources, thus the processing devices 102 have multiple cores. In addition, certain embodiments involve the use of videos (i.e., graphics intensive information) or digitized information (i.e., digitized graphics), these embodiments therefore employ graphic processing units (GPUs) as the processor(s) 102 in lieu of or in addition to CPUs.

Certain embodiments also comprise at least one database 118 for storing desired data. Some raw input data are converted into digitized data format before being stored in the database 118 or being used to create the desired output data. It's worth noting that storage(s) 116, in addition to being used to store computer program(s) 106, are also sometimes used to store input data, raw or processed, and to store intermediate data. The permanent storage of input data and intermediate data is primarily database(s) 118. It is also noted that the database(s) 118 may reside in close proximity to the computer architecture 100, or remotely in the cloud 124, and the database(s) 118 may be in various forms or database architectures.

Because certain embodiments need a storage for storing large volumes of photo image/video data, more than one database likely is used.

The provided method and/or system involves scanning of a handheld identification document via a photographing device such as a mobile or edge-based device (an edge-based device captures, stores, and pre-processes of pictures of an object or document). A flashlight on the device creates an illumination condition, under which the surface of the document is illuminated, thereby revealing holographic features (either security features or Identification features) that are otherwise, in some cases, invisible to human's naked eyes. Due to the physical nature of the holographic features, the illumination response at each tilting angle the document is held against a vantage point or camera is distinct and fixed, being unique to the tilting angle.

Figure 2:
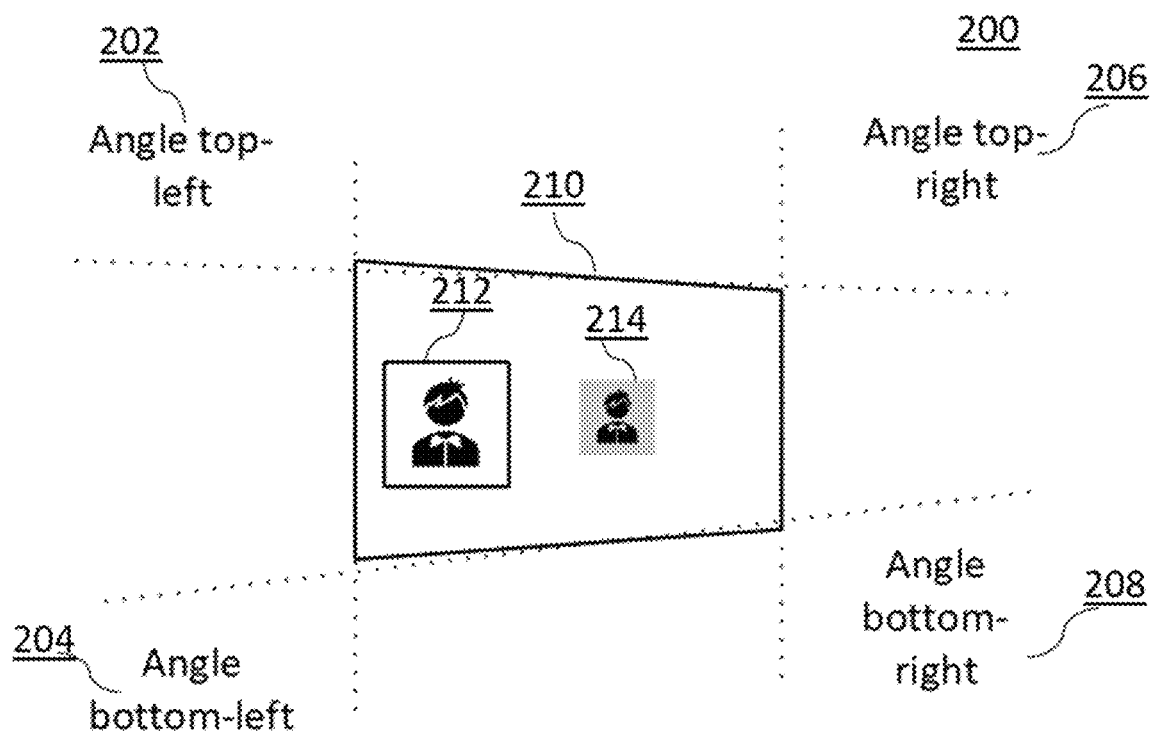
FIG. 2 schematically illustrates angular estimation of a document's tilt at which the document is scanned by a user, according to certain embodiments.

FIG. 2 shows a setup 200 in which an identification document 210 (a rectangular card document such as a driver's license) is held at four distinct tilting angles (angle top-left 202, angle bottom-left 204, angle top-right 206, and angle bottom-right 208) from a vantage point or camera where the document has at least one human-face image 212 and at least one holographic entity 214.

It is noted that the four different tilting angles shown in FIG. 2 do not mean that the document can only be held against a vantage point or camera in such four particular angles, nor do they mean that the optimal number of tilting angles a document to be scanned is four. Rather, the optimal number of tilting angles for a document to be scanned during the scanning process depends on, among other considerations, the properties of the holographic entities embedded in the document and time constraint of the scanning process, and practically, time permitting, the more tilting angles being used in the scanning the more precise the angular responses of the document under the illumination condition would be captured.

Figure 3:
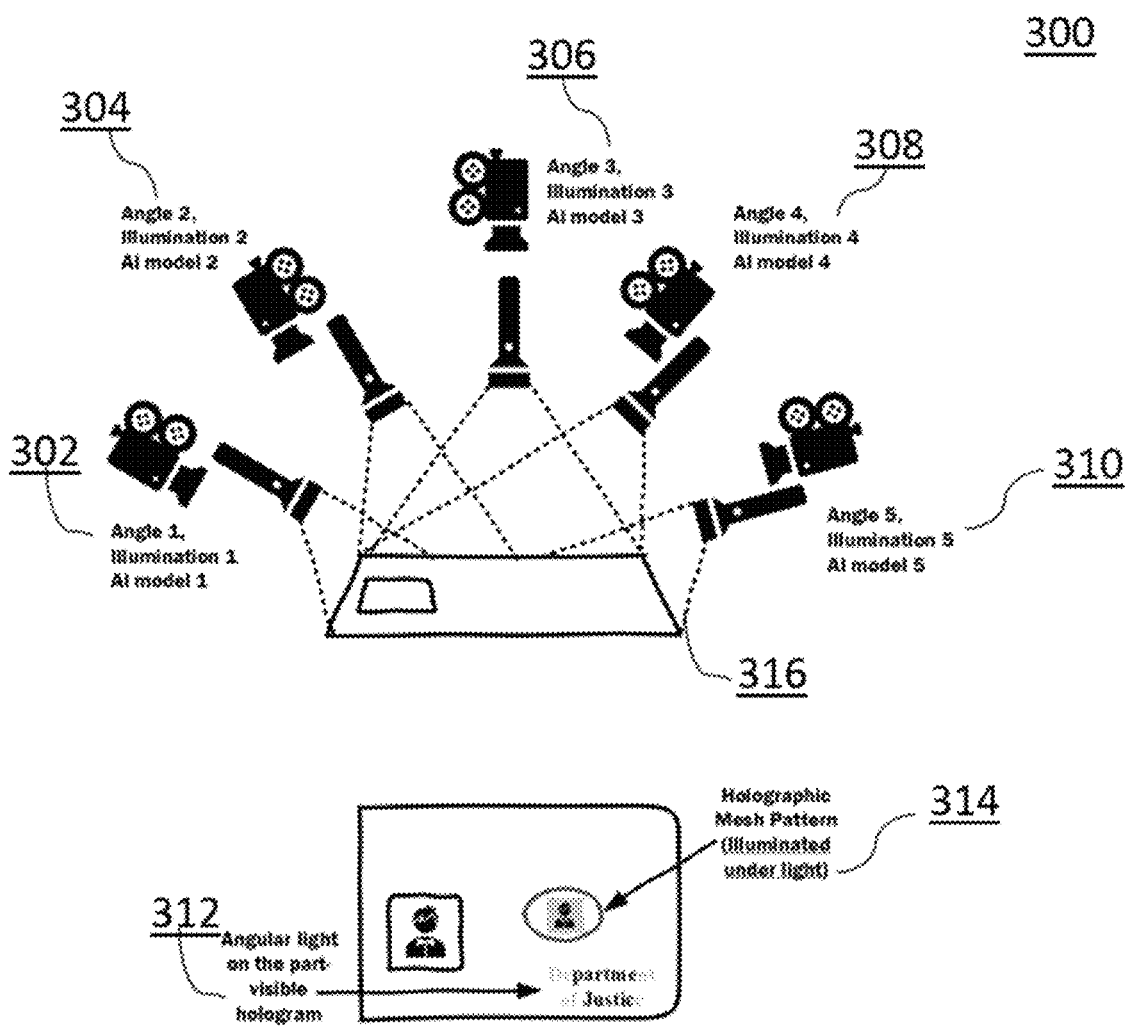
FIG. 3 schematically illustrates an entire left-to-right scanning via flash-based illumination to reveal a security feature of the document under the illumination such as hidden holographs, according to certain embodiments.

FIG. 3 shows a complete document scan process 300 where a user holds a document 316 in their hand and scan it from one side (the left) to another (the right) while at certain, approximately pre-fixed five angles (302, 304, 306, 308, and 310) the document's illuminated surface is captured by the software application. The shown five angles can be either facilitated by tilting the document 316 against the camera and light source (symbolised by the flashlight) while the camera and light source are fixed during the scan process or moving the light source and camera to let its emitted light ray shine upon the document at different angles while keeping the document fixed. The objective of this scan process is to allow a computer vision machine learning model to learn the reflective responses at these angles to enable the model to identify similar embedded holographic features in other documents of the same genre. The light source, in some embodiments, is integrated with the camera used to scan the document, such as a camera equipped with a flashlight, or a smartphone that can take a photo with flash on. The light rays emitted from the light source creates an illumination condition that encompasses intensity, warmth and other optical properties of the light rays. Ideally, the illumination condition under which identification documents are scanned is consistent throughout all the scanning processes so that the documents' response to the illumination remain consistent from one scan to another. It is also noted that in some embodiments, the light source may be fixed, and it is the camera or the documents to be scanned that are tilted at various angles during the scanning processes. Under this arrangement, tilting the documents to different angles against the scanning camera or tilting the scanning camera to different angles against the documents would equally facilitate the same result of having the scanning camera receive lights reflected from the documents' surface that are illuminated from a fixed source of light.

That is to say, the light source shown in FIG. 3 appears to change angles toward the document along with the camera, but in practice, the light source can remain fixed while the camera scans the document from one tilting angle to another. In some embodiments, the system may prompt and/or interact with, via some on-screen or voice instructions, the user of the system to place the document under the fixed illumination condition at a different tilting angle against the scanning camera for taking another scan.

Specifically, FIG. 3 shows five such instances where each instance represents the a camera tilting at a distinct tilting angle scanning a stationary document (a Saudi Arabian Resident Identity document). In one instance, the scan results in partially revealed holographic entities including a mesh pattern 314 and some portion of the "Department of Justice" 312 written at the bottom right of the document in both Arabic and English languages. The five scan instances each under one of the five distinct tilting angles (302, 304, 306, 308, and 310) reveals different part of the hidden holographs, and collectively, the scan results are to be used to train an AI-based object detection model (i.e., a computer vision machine learning model).

The underlying concept of all the embodiments of the disclosure is to capture various angular responses for a genre of identification cards under a particular illumination condition ("IC" hereinafter). Several identification documents of the same genre (i.e., identity documents of multiple individuals but of the same genre such as passport issued by the same government, or driver's license issued by the same jurisdiction) are scanned to capture various angular responses of the genre of documents, which are then used to train an AI-based object detection model to learn an illumination response for each distinct tilting angle. Collectively, the illumination responses for various tilting angles form a set of angular responses of the document genre. Once the model is fully trained, it is encoded with the set of angular responses of documents of the document genre. In the set of encoded angular responses, there is at least one piece of descriptive information about each security/ID feature of the one or more security/ID features embedded in the documents of the document genre. The piece of descriptive information about a security/ID feature may be the size, boundary, or shape of the feature at a particular tilting angle under which the feature is captured. By the extension of this underlying concept, the AI-based object detection model can be enhanced by training it with the document genre's responses under other illumination conditions (such as intensity, warmth of the light) in addition to various distinct tilting angles, to help the model more precisely learn and generalize the holographic features embedded in the documents of the document genre.

Once a considerably large dataset that holds scan results for one or more sample documents is obtained, each holographic response to the one or more documents contained in the dataset is labelled based on any of the well-established pattern recognition algorithms such as a bounding box detection annotation mechanism based on YOLO ("You Only Look Once" algorithm)/SSD ("Single Shot MultiBox Detector" algorithm) object detection technique, a polygonal annotation mechanism based on semantic segmentation principles, or a Mask (i.e., Mask R-CNN for Object Detection). Specifically, one or more of these techniques are used to extract holographic responses under the IC from the captured images/videos (i.e., the scan results), and the extract responses are duly labeled with descriptive information such as coordinates, size, object class, and corresponding tilting angle.

Figure 4:
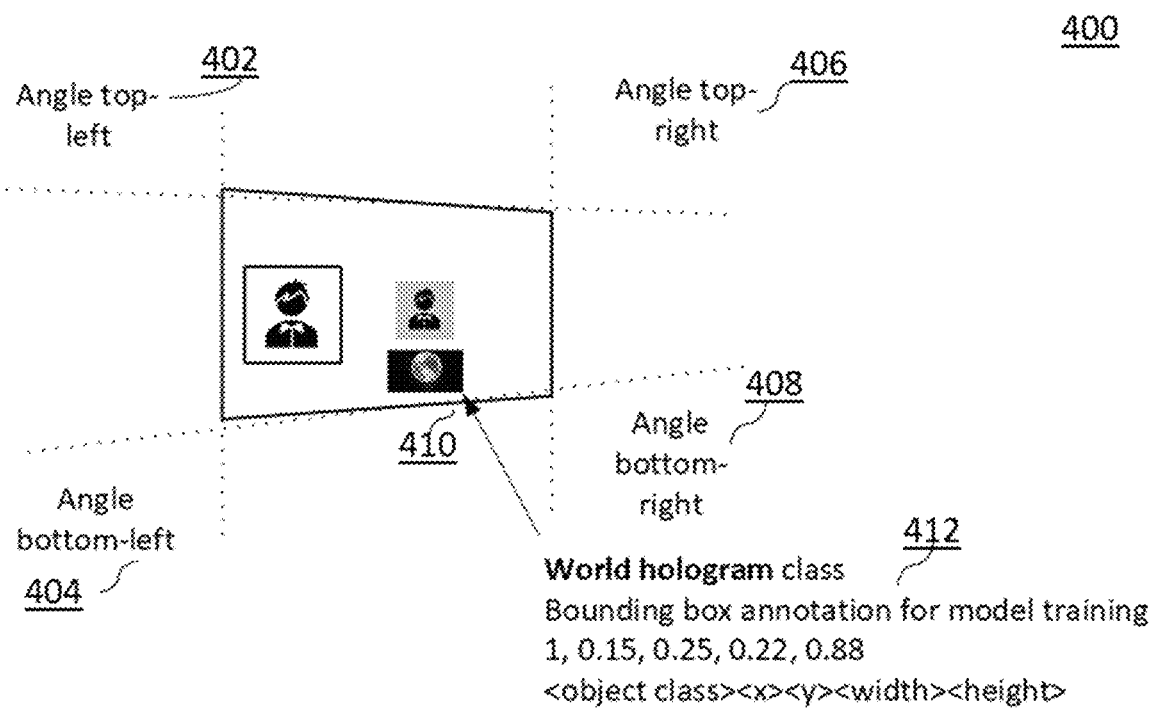
FIG. 4 schematically illustrates a landmark extraction mechanism for each scan angle to train an AI holographic detection model, according to certain embodiments.

FIG. 4 shows a setup 400 for scanning a target document under four different angles (402, 404, 406, and 408. Note, the scans are not necessarily conducted in the particular shown order of using the four angles) and an example of a bounding box surrounding the extracted Driving-wheel hologram 410 of an UK's driver's license. The bounding box is precisely annotated with its relevant properties 412 such as object class (i.e., the type of the object), coordinates the boxed object located in the entire photo image, and the width and height of the boxed object. The data extraction (or feature extraction) technology on the scanned document, coded as On-document Sub-image Data extraction, is used to extract the boxed hologram 410. Each document's validity is verified based on its various landmark parts as detected bounding boxes (such as 410). Each boxed object represents the document's embedding's response under an IC at a certain tilting angle. Although the underlying concept of the scan process as a means of verifying an identification document is to emulate a human reviewer's ability and process to identify watermarks and holograms on secure documents such as passports, identity cards, and banknotes, the scan process produces much larger and more precise datasets than human's naked eyes, and the datasets will be later on used, and reused, to train one or more AI-based object detection models to become a much more reliable and faster detector than human detector for authenticating an identification document. The scan process, obviously, is also more scalable and has more reusability in comparison with using human eyes to verify identification documents.

The provided method and/or system entails utilizing a photographing device such as an edge or mobile device that has capabilities of a camera, a light-source, and a user interface and computational power to capture and computationally process images or videos of sample documents, training an artificial intelligence (AI) model on the response (illumination feedback) of directional light shone on the documents at various distinct tilting angles, and employing the trained AI model to validate one or more target documents of the same document genre as the sample documents. It is noted that a sample document is an identification document that its authentication is known and verified as valid, whereas a target document is an identification document that its authentication is unknown and is to be verified, and both the sample document and the target document bears the same types of security features.

Figure 5:
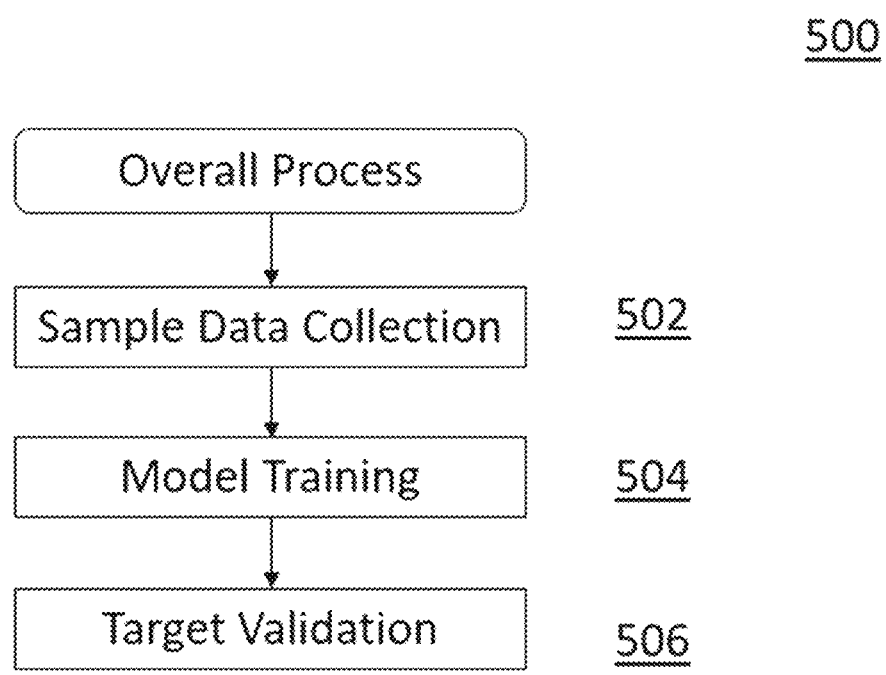
FIG. 5 illustrates a schematic flowchart for the overall process of authenticating a target document based on an AI model trained on sample data, according to certain embodiments.

Specifically, a camera for scanning sample and target documents, light-source for angular illumination upon a document to be scanned, and a user interface and one or more GPUs or CPUs or combination of GPUs and CPUs (or other types of computer processors) to perform program execution on each of the videos/image frames that are captured from the documents to perform a set of operations as follows and schematically shown in FIGS. 5, 6 and 7.

a. The light source is used to illuminate, from a set of distinct tilting angles, certain security features (such as a holographic watermark) of the documents that otherwise, in some cases, may remain hidden to naked human eyes. This step is called as the illumination process as shown in FIG. 6 as a part of the Data Collection process 600. In 600, illuminating a document, be it a sample document or a target document, at multiple distinct tilting angles, one angle a time (602) precedes the scanning process (604 and is discussed below). Note, since the tilting angle of a document held against a scanning camera is achieved by holding, usually by hand, the document at the certain placement angle, the tilting angle is also called as placement angle. Since the precise value of a placement angle may not be known because the document is held by hand to a certain but unknown tilting angle, and since the placement angle matters to digitally quantifying the document's response under an IC, the value of the placement angle will need to be estimated (see step 606 of FIG. 6). In the case when the placement angle is secured by a mechanical and automated way, the placement angle is known (since the mechanical and automated way of tilting a document is under control of mechanic means such as a servo motor, the angle can be precisely calculated from the rotation of the motor) and thus the step of angle estimation (606 of FIG. 6) is unnecessary. Note, in some embodiments, the illumination process and the scanning process can happen simultaneously. Specifically, a document is deliberately and steadily held against the camera at a tilting angle (i.e., a placement angle), allowing the light ray from the light source shine upon the document at a particular incident angle and thus the reflecting light from the surface of the document at another particular reflective angle. Then, a photo or a video is taken by the camera upon the document. Thereafter, the document is deliberately and steadily held against the camera at a different tilting angle (i.e., another placement angle), and another photo or video is taken by the camera upon the document. This illuminate-n-scan process can continue for a number of iterations in a certain order (e.g., from the left side of the document to the right side of the document, or vice versa, as shown in FIGS. 2-4), in each iteration the document is held at distinct tilting angle against the scanning camera. Alternatively, the document can remain stationary while it is the camera and/or the light source are moved at each iteration to make a distinct placement angle toward the document. As mentioned before, alternatively, both the document and the light source may remain stationary while the scanning camera takes photo pictures or videos of the document from various tilting angles.

b. The camera is used to capture a set of different angular images/videos of the document, each of the images/videos is captured from a distinct placement angle from the documents. This step is called as the scanning process as shown in FIG. 6 as a part of the Data Collection process 600. In 600, scanning a document, at multiple distinct tilting angles (i.e., multiple placement angles), one angle a time (604) succeeds the illumination process (602 and is discussed above). Note, in some embodiments, the two processes can happen simultaneously. Although the scanning process is generally the same in scanning a sample document as in scanning a target document, in some embodiments, there is a nuanced distinction between them—scanning of a sample document is to take just one image/video on the entire sample document whereas scanning of a target document is to take multiple images/videos on the target document and each image/video is taken upon just one security feature of the target document, and the distinction is described in detail in subsection f.1 below.

c. When the value of a placement angle is unknown during a scanning process, a machine learning algorithm is used to estimate the value of the placement angle of the document being held during the image/video scanning process. The estimated angles are associated with their corresponding image/video captured in the scanning process, and they are aggregated as a part of the dataset representing the document's responses to the illumination at various angles. This step is called as angle-estimation process as shown in FIG. 6's Data Collection 600's step 606. Once the angle for each captured image/video is estimated, the angle is associated with the image/video and they are aggregated in a retrievable dataset (step 608 of 600). The dataset then, as one skilled in the art would understand, is stored in a memory (such as 104 of FIG. 1) or database(s) (such as 118 of FIG. 1). Note, as mentioned above, the angle-estimation process is unnecessary if the scanning process is conducted when the placement angle of the document being scanned is known. In that case, the known placement angle is associated with the captured image/video, and they are aggregated in a retrievable dataset.

d. Applying aforementioned illumination process, scanning process and angle-estimation process to a number of sample documents to build a sufficiently large sample dataset of sample documents' angular responses under an illumination condition. This step is called as sample data collection process, as shown in FIG. 5's Overall Process 500's step 502. Due to the presence of data noise (i.e., distorted data or nonsensical data) in the collected sample data, the size of the sample data ought to be sufficiently large to mitigate the noise's impact and the sample data, in practice, would better be collected from a plurality of sample documents to avoid overfitting (Note, overfitting occurs when a machine learning model becomes reliably capable to classify or predict on data that was included in the training set, but is unreliable at classifying data that it wasn't trained on. In short, the model has overfit the data in the training set at the detriment of being reliably applicable to a broader dataset.) For example, 850 samples are collected based on a number of new Saudi Arabian identity cards. It is noted that a target data collection process (702 of Target Validation process 700 of FIG. 7) is similar to a sample data collection process (502 of FIG. 5), with a nuanced distinction described in subsection f.1 below. It is noted that sample data, upon being collected, are not necessarily put into use as indicated in FIG. 5 which shows the Model Training step 504 follows Sample Data Collection step 502. Rather, sample data collected at 502 may be stored in one or more databases for later uses. In other words, sample data collection 502 may well be detached from model training step in terms of time and location (i.e., sample data can be collected at a time and location different from the time and location when/where the model training uses the collected sample data.) In fact, in that case, the sample data collected and then stored do not have to have their angles estimated as shown in step 606 of FIG. 6. Rather, the stored sample data can be just the collected images/videos, and when the stored sample data are retrieved from the storing database(s) for feeding into the model training, the placement angles of the retrieved images/videos, if their values are unknown, can then be estimated. In short, step 606 (angle estimation) does not need to happen right after step 604. In some embodiments, step 606 does not happen at all when in step 604, documents under scanning are tilted to a precise angle by an automated angle adjustment mechanism (such as a servo motor), and as a result, the tilting angles of the captured images/videos from Documents are known and thus known values of the precisely placed angles are stored along with the captured images/videos, rendering the angle estimation step 606 unnecessary.

e. Based on the sample dataset (i.e., the organized collection of sample data) representing the responses under an illumination condition at various tilting angles of sample documents of a document genre, a computer vision algorithm is utilized to train an AI model to learn the angular responses of a document genre under the illumination condition. This step is called as the model-training process, as shown in FIG. 5's Overall Process 500's step 504. The computer vision algorithm is an Artificial Neural Network based Convolutional Neural Network, and the underlying model architecture is known as YOLO (You Only Look Once) that is based on the approach of segmenting an image into several sub-images as a grid and analyzing each sub-image one by one. Specifically, YOLO applies a bounding box detection technique that extracts a set of sub-features (such as a holographic image, a holographic letter string) from a captured image/video and each of the sub-features is labeled with, among other properties (such as shape, coordinates, size), one distinct class type to computationally distinguish the sub-features from each other. The model-training process is to learn the patterns among the properties of each extracted feature and the angle associated with feature. Upon being fully trained, the learned model is encoded with a set of angular responses of the document genre which contain a set of descriptive information (such as coordinates, size, shape, etc.) about each security feature at each tilting angle.

f. A computer vision inference algorithm (such as YOLO) is then employed, to use the trained AI model, to automatically validate, via inference, the authentication of a target document based on an arbitrary number of angular images captured by an edge or mobile device upon the target document. This step is called the target-validation process (FIG. 7's Target Validation 700), as shown in FIG. 5's Overall Process 500's step 506. The target-validation process consists of a target data collection process (FIG. 7's Target Validation 700's step 702) and a validate-against-the-model process (FIG. 7's Target Validation 700's step 704).

1. In the target data collection process (702), the ways of capturing an arbitrary number of angular images/videos of the target document and estimating the angles corresponding each of the captured images/videos are mostly similar to the ways of capturing an arbitrary number of angular images/videos of a sample document (i.e., scanning the document in a certain order such as from the left to the right (or vice versa) and estimating the value of placement angles corresponding each of the captured images/videos, which are described in the illumination process, scanning process, and angle-estimation process. Note, as mentioned before, the angle-estimation process is unnecessary and will be skipped if the value of each placement angle is known. In some embodiments, the difference between capturing the security feature data from a target document at a tilting angle and capturing the security feature data from a sample document at a tilting angle is that scanning process applied to a target document is broken down to several sub-scanning processes, each of which is to capture just one security feature of the target document at the particular tilting angle, whereas the scanning process applied to a sample document is just one scan process that takes just one "jumbo image/video" of the entire sample document at the particular tilting angle. It is in the model-training process that the "jumbo image/video" of the sample document at the particular tilting angle is fed into the YOLO to be segmented into a set of security features. Obviously, using YOLO to automatically extract a set of security features from one image/video saves time and effort for human operators (who are involved in the scanning process) at a certain cost of losing accuracy of feature detection on the part of YOLO because some features are located on the captured image/video at such a close range that YOLO is not always able to accurately set the features apart. However, the upsides of using YOLO to automatically extract a set of security features from one captured image/video outweighs the downsides thereof when it comes to its application in collecting sample data. The upsides of using YOLO to automatically extract a set of security features on a sample document is amplified by the large quantity of sample documents to be scanned, and the downsides thereof is also mitigated by the large quantity of sample data to be collect. The same cost-effective rationales, however, do not apply to collecting data for a target document, because unlike the data collected for the sample documents (i.e., a plurality of sample documents), the data collected for the target document (i.e., a single document) has small size data points, and the small size of the data points accentuates the importance of precision of each data points, and also because for each target document, the precision of captured security features of the document is uttermost important as the captured security features are the ones to determine whether the document is valid or not. Therefore, each security feature on the target document, in some embodiments, is dedicatedly scanned and thereafter computationally extracted to avoid the occasional imprecision during YOLO's automatic extraction of multiple features from a single captured image/video.

2. In the validate-against-the-model process (704), each extracted security feature of the target document, with the representation of its coordinates, normalized width and height, and class label, is checked against the learned AI model to produce an inferenced confidence score. Collectively, all the scores (each of which corresponds to a security feature) are summarized to one overall score, which will be used to determine whether the target document is valid or not, based on, for example, whether or not the overall confidence score surpass a predetermined threshold score. Specifically, when authenticating the target document of a document genre with regard to the extracted security feature, the extracted information about the feature is compared with the piece of descriptive information about the feature that is encoded in the learned AI model, as a part of the set of angular responses of the document genre under an illumination condition, if the comparison yields a confidence score that is below a predefined threshold score, then the target document is considered as unauthentic, otherwise the target document is considered as authentic with regard to the extracted security feature. Since there are multiple security/ID features embedded in a target document, the target document ideally needs to be authenticated on each one of the multiple security/ID features if time permits.

It is worth mentioning that the model training (504 of FIG. 5) utilizes an algorithm originated from a well-known genre of machine learning algorithms called Artificial Neural Networks (ANN). The underlying architecture of ANN combines both classification as well as prediction of objects/patterns via a single neural network which makes the architecture highly efficient. In some embodiments, the underlying classification and prediction architecture is further optimized to achieve better accuracy in classification and prediction, and faster learning the collected sample data including the tilting angles of sample documents in association with their corresponding captured images/videos.

Figure 7:
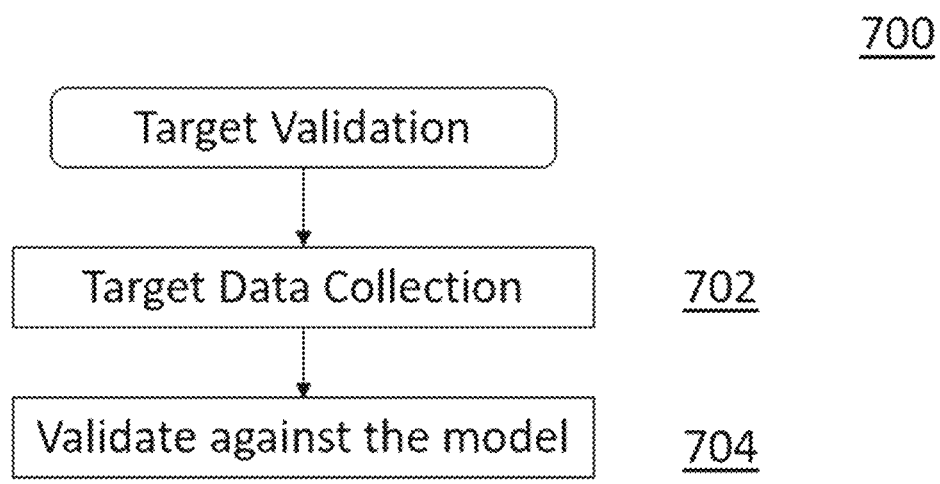
FIG. 7 illustrates a schematic flowchart for target validation (i.e., authenticating a target document), according to certain embodiments.
Figure 8:
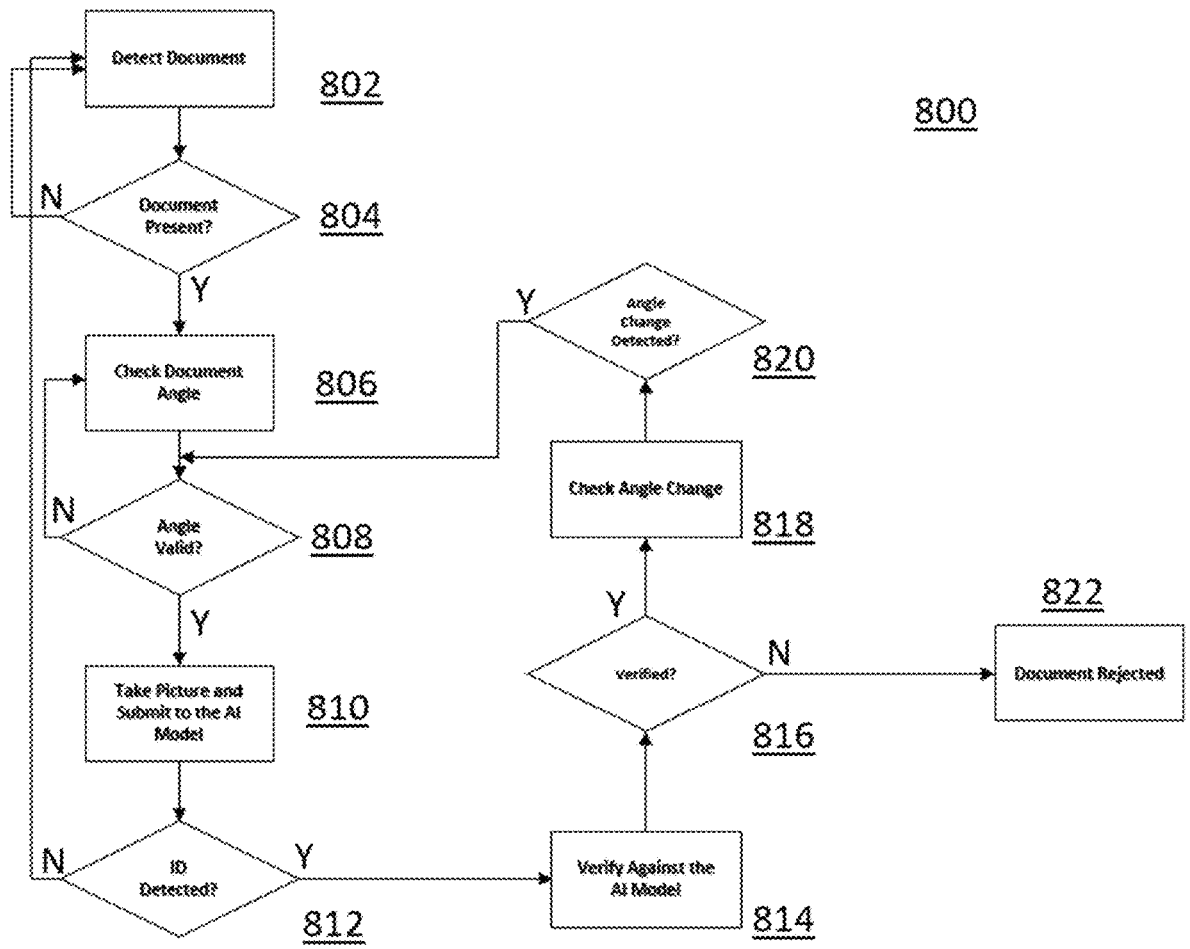
FIG. 8 illustrates a schematic flowchart for document analysis based on angular document image capturing, according to certain embodiments.

FIG. 8 shows a schematical flowchart 800 presenting the breakdown steps of target validation 700 of FIG. 7. The validation process starts with detecting a target document (802) of a document genre by asking the question of "whether or not is a target document present?" (804). If the answer to the question is "yes", the process proceeds to checking the document's tilting angle (806). If the answer to the question is "no", the process reverts to step 802, continuing to detect a presence of a target document and in some embodiments, prompting the operator of the system to place a target document under the light source (and/or the camera).

The step 806 essentially checks whether the perceived angle with which the target document is held against the scanning camera is out of a pre-determined allowable range, and asks the question of "whether is the angle valid?" (i.e., whether or not is angle is out of the pre-determined allowable range?) (step 808). If the answer to the question is positive, then taking a picture (or video) upon one of the target document's identification/security features or security features (such as a holographic image embedded therein) and submitting the captured picture (or video) to the trained AI model for verification (step 810). Taking a picture (or a video) upon one of the target document's identification/security features is essentially Target Data Collection 702 (which is described above). If the answer to the question of "Is the angle valid?" is negative, the process reverts back to step 806, prompting the operator of the system to adjust the tilting angle with which the target document is held against the scanning camera.

Before the submitted identification/security feature is verified by the trained AI model, the submission is first checked to see if it actually contains an identification/security feature (step 812). If the answer to the question is negative, the process reverts back to step 802, prompting the operator of the system to place a valid document under the camera. If the answer to the question is positive, the process proceeds to step 814, feeding the captured identification/security feature to the trained/learned AI model to verify. In step 814, the trained/learned AI model, using the angular responses of the document genre under the illumination condition that it learned based on the sample data of the document genre used to train the model, make an inference about whether or not the submitted bears close resemblance to the same genre of the identification/security feature captured in a similar tilting angle for the sample documents, and based on the inference, the AI model produce a likelihood/confidence score (which will be discussed later). In step 816, the likelihood score is checked to see whether the score at least reaches a pre-defined passing score to determine whether the target document is verified with regard to the ID/security feature.

If the check result of step 816 is negative, then the target document is rejected as an invalid document (step 822). If the check result of step 816 is positive, the document can be accepted as a valid document. But in practice, in order to ensure the validation is reliable, the target document usually is held in a different tilting angle against the camera to take a different picture/video in the new tilting angle. That's why the loop consisting of step 818 ("check angle change"), step 820 ("checking whether an angle change is detected"), and step 808 ("whether the angle is valid") is present in the process. In general, in order to be very sure about authenticity of a target document, for each of identification/security feature of the target document, the feature is photographed in multiple tilting angles and is checked against the learned AI model for each of the multiple angles. Alternatively, an operator of the system, can choose and pick just one or two identification/security features of a target document to go through above process in just one or two tilting angles, to have a speedier verification process.

In some embodiments, the flow of steps for verifying a target document may deviate from what is presented in FIG. 8 in a way that ID/security features are taken from the document in bulk before feeding them altogether into the trained/learned AI model for verification. Instead of scanning one ID/security feature of a target document at one tilting angle and submitting the captured image/video of the feature to the trained/learned AI model for verification, an operator of the system can scan multiple images/videos of one ID/security feature of a target document (each scanning is conducted on a distinct tilting angle with which the document is held against the camera on the chosen ID/security feature), and submit the captured multiple images/videos in bulk to the trained/learned AI model for verification. The verification, conceivably, would produce a comprehensive likelihood score that represents a comprehensive degree of likelihood at all the tilting angles for the chosen ID/security feature of the document. Furthermore, the operator of the system can scan multiple images/videos of all ID/security features of a target document (each scanning is conducted on a distinct tilting angle with which the document is held against the camera on one of the multiple ID/security features), and submit the captured multiple images/videos in bulk to the trained/learned AI model for verification. The verification, conceivably, would produce a comprehensive likelihood score that represents a comprehensive degree of resemblance at all the tilting angles for all the ID/security features of the document.

Figure 6:
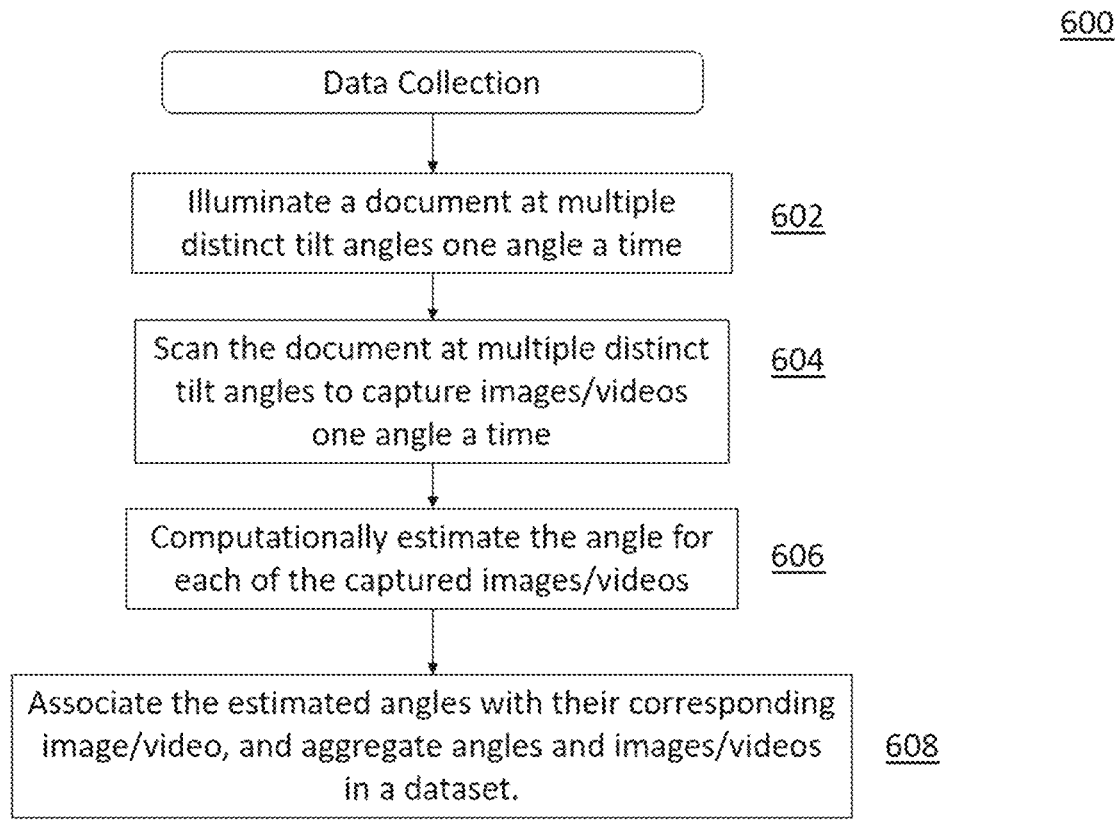
FIG. 6 illustrates a schematic flowchart for the data collection process. The flowcharted process applies to both collecting sample data and collecting target data, according to certain embodiments.

Data Collection 600 of FIG. 6 has a step of computationally estimating the value of placement angle for each of the captured image of a document (step 606). The detail of this step is shown in the algorithm in Table 1.

TABLE 1

The angle-estimation algorithm for each consecutive document image.

Input: An RGB image frame γ with dimensions m × n [rows × columns]
Output: the document skew angle α against the camera screen surface
   set α = null
     Do:
        Input: Apply Horizontal Edge Detection (HED) on image frame γ
          Output: Image frame γ' as a horizontal edge representation
          Extract horizontal lines on image frame γ'
          Remove smaller/larger lines against a threshold as γ"
          Calculate document angle between the two matching lines
             Input: Processed frame as γ"
             Output: Document skew angle
             Validate the angle to be within the threshold
                Apply an Object Detection on image γ
                Input: Image γ, threshold ε for document acceptance/rejection for angle α
                Output: Model score/likelihood ρ
                   if ρ (0,1) > ε then
                     Return True
                   else
                     Return False
     While angle-counter < 5 and 0.05 ≤ α ≤ 1.05 ∈ p where p is a range of permissible document angles The shown algorithm takes in an image of a document, applies edge detection techniques to detects lines from the image, and returns an angle with which the document is held against the camera screen surface. The reason of using computational means (as opposed to a mechanical means) to estimate the angle for each of the captured image of a document is to cut the cost and time of using mechanical means of holding the document (or the camera/light source) in a particular tilting angle. Nevertheless, in some embodiments, a document is scanned at a mechanically controlled tilting angle so that the computational estimation for the angle used for each captured images of the document is unnecessary and skipped. The mechanical means used to precisely tilt the document (or the mobile/edge device) to a desired tilting angle can be a servo motor driven platform on which the document (or the mobile/edge device) is placed. Because a servo motor can be precisely controlled, the tilting angle of the servo motor driven platform can be precisely controlled and precisely calculated based on the rotations of the motor.

Figure 9:
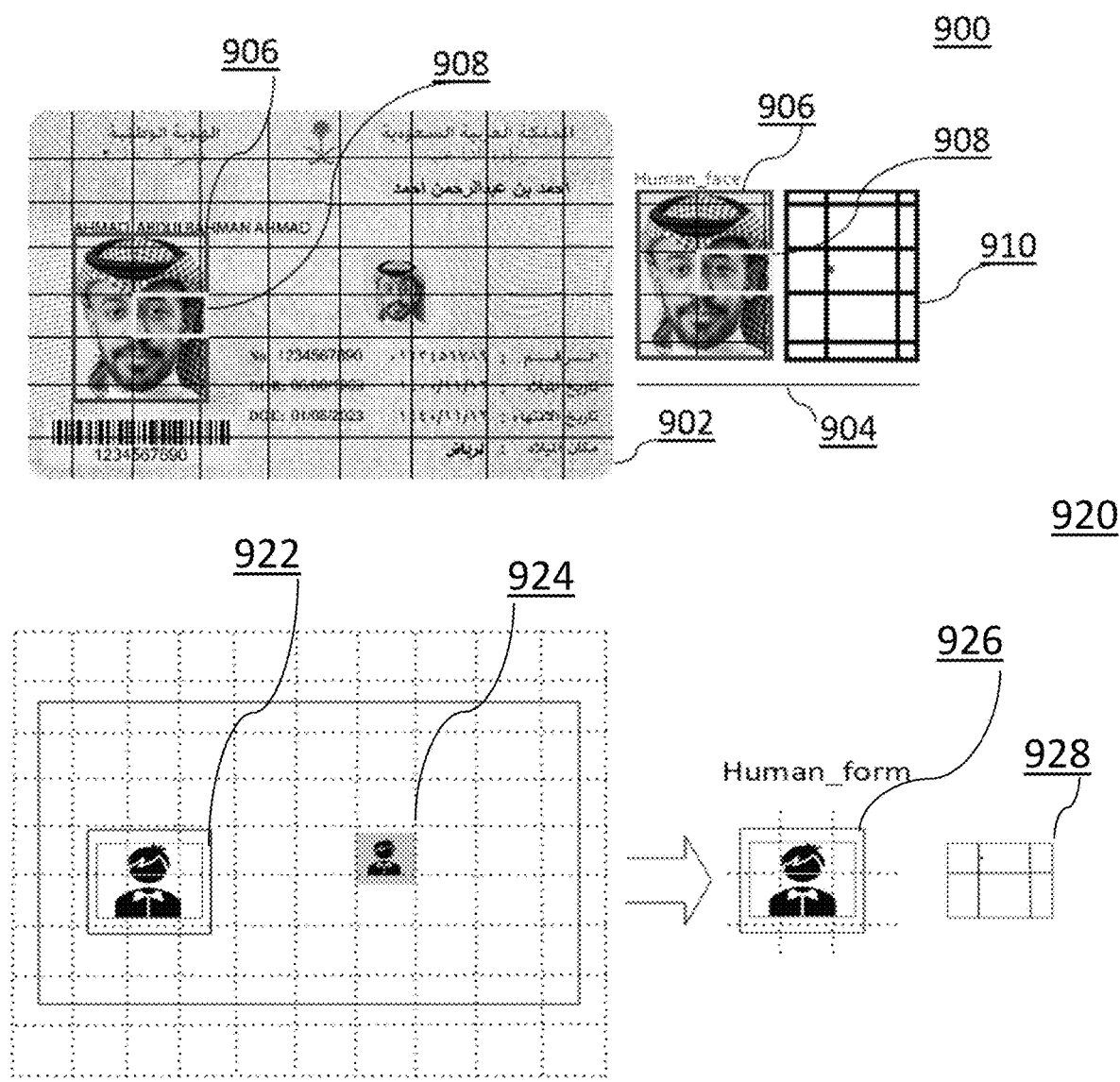
FIG. 9 schematically illustrates dividing a document image into a multi-cell sub-image grid, according to certain embodiments.
Figure 10:
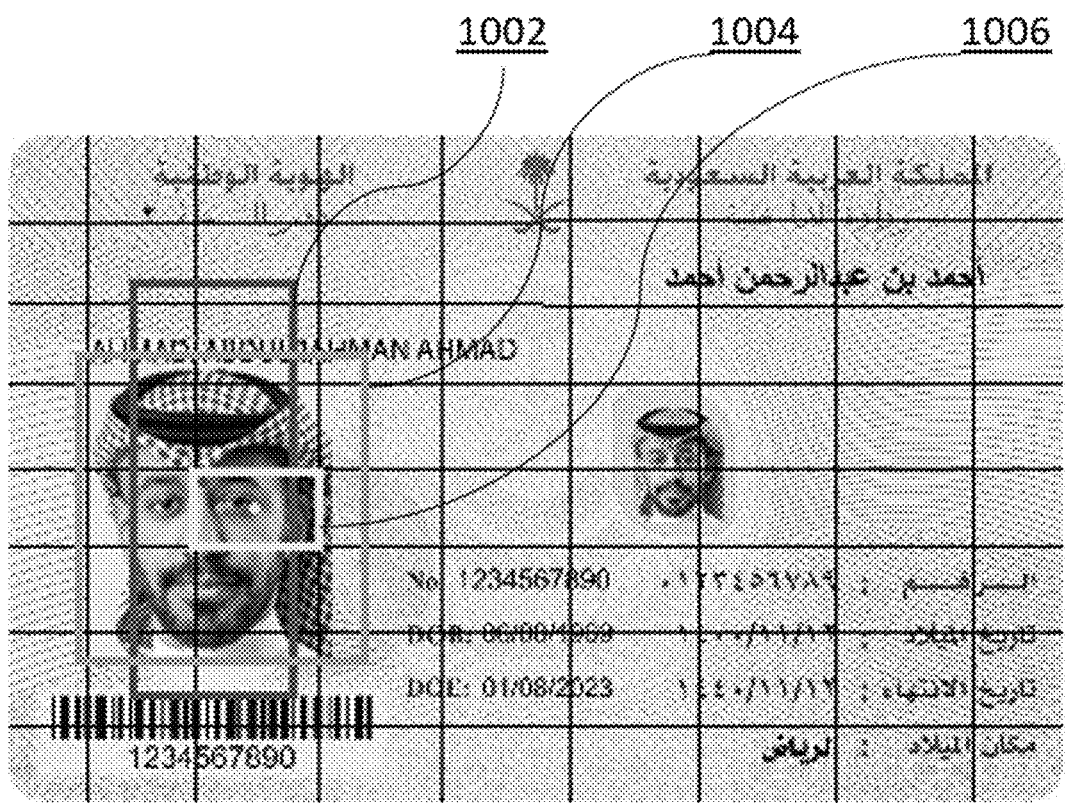
FIG. 10 schematically illustrates a representative box along with its various representative values for the "human face" object in the document, according to certain embodiments.
Figure 10:
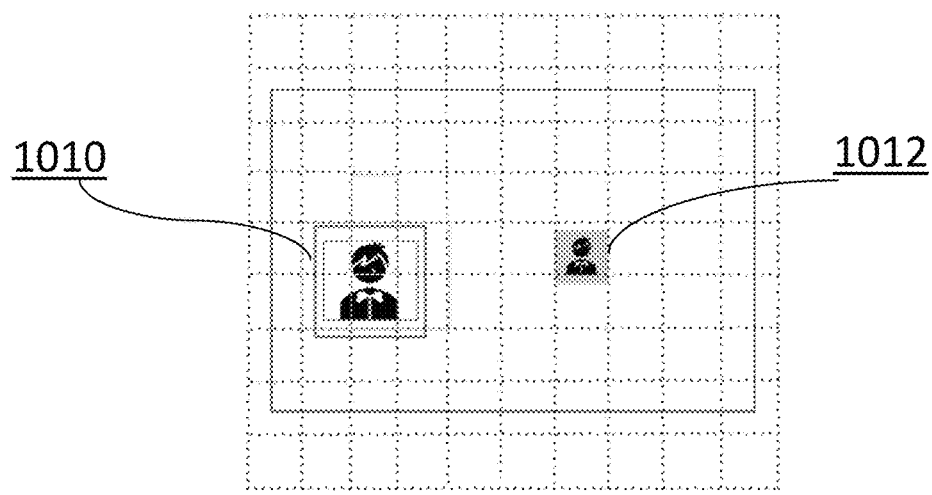
Figure 11:
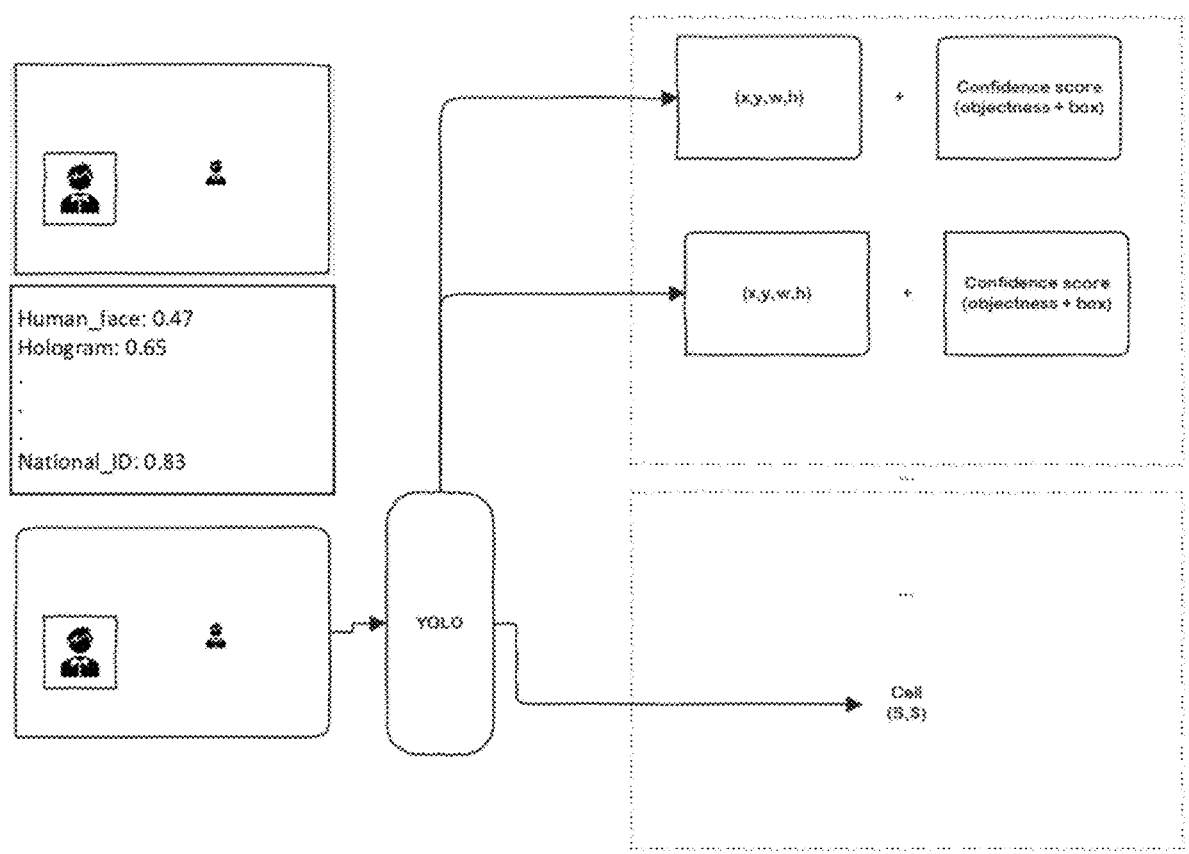
FIG. 11 schematically illustrates a diagram representing an S×S prediction based on B bounding boxes ("Beta Regression bounding boxes technique"), according to certain embodiments.

FIGS. 9-11 illustrate the bounding box technique applied to extract interested features from a captured image/video of a document. In FIG. 9, the upper portion—a schematic image 900 of an identification document (an ID card)—is shown in a grid cell array, representing the image is divided into a multi-cell sub-image grid. 902 shows the image of the ID card that is divided into multiple cells by a grid in which boxed cell 906 surrounds the face of the card's holder, and inside 906, a smaller boxed cell 908 surrounds the left eye of the card's holder, whereas 904 shows a 906 being carved out from the image of the card, the grids 910 being part of 906, and the smaller boxed cell 908 being part of 906 as well. 902 also represents the identification of the ID card object, 906 represents a human face object, and 908 represents a human eye object. The lower portion of FIG. 9 (920) shows a feature-only placed in grids of the ID card: box 922 contains a human form 926, box 924 wraps around a security feature, and box 928 is the smallest box wraps around the human form. Each cell identifies 'n' number of bounding boxes as well as a likelihood score for each bounding box. The aforementioned trained AI model predicts two bounding boxes by default with the likelihood of each bounding box to belong to a class ranging from '0' to '1'. A '0' score identifies the lowest probability whereas a '1' identifies the highest probability. If no object exists in a cell, the score shown is '0'. These confidence values show the likelihood or certainty of an object to occupy a cell as well as the confidence of the bounding box to be accurate.

The bounding box algorithm divides the image into a grid cell array of S×S cells with each cell predicting only one object (although, in some embodiments, each of these grid cells predicts a fixed number of multiple objects). For example, the small cell 906 in FIG. 9 is used to predict the "human_face" object whose focal center (the shown little dot) falls within the grid cell 908 and represents the area around a human eye. In the example further elaborated in FIG. 10, which shows a grided image 1000 of an identification card. In 1000, the shown smallest grid cell 1006, which intersects with the rectangle grid cell 1002, and the square grid cell 1004, predicts two bounding boxes (1002 and 1004) to locate where the "human_face" class is. Each cell has class probabilities for all possible classes. FIG. 10 also shows the identification card in a feature-only placed within grid form 1008, in which 1010 is a boxed ID feature (i.e., the photo of the ID holder), and 1012 is a boxed security feature.

The bounding box shown in FIG. 10 such as 1006 comprises of five values including, x-position, y-position, width, height, and box confidence score. The 'x' and 'y' coordinates represent the relevant pixel-based column and row number of the center of the bounding box whereas the width and height represent the fractional values relative to the actual image's width and height. The likelihood or confidence value, according to a known Bounding Box Regression technique, represents the level of accuracy when the Intersection of Union (IoU) of the percent area of the model-predicted bounding box against the actual (ground-truth) bounding box is divided by the area of union of both the model-predicted and ground-truth bounded boxes.

Under Bounding Box Regression technique, most recent object detection programs have the concept of anchor boxes, also called prior boxes, which are pre-defined fix-sized bounding boxes on image input or feature map. The bounding box regressor (i.e., the Bounding Box Regression algorithm), instead of predicting the bounding box location on the image, predicts the offset of the ground-truth/predicted bounding box to the anchor box. For example, if the anchor box representation is [0.2, 0.5, 0.1, 0.2] (note, those four values are [x-position, y-position, width of the box, height of the box]), and the representation of the ground-truth box corresponding to the anchor box is [0.25, 0.55, 0.08, 0.25], what is predicted then is the offset—[0.05, 0.05, −0.02, 0.05]. If both the prediction and the corresponding anchor box representation are made known, then predicted bounding box representation would be readily calculated back, which is often called as decoding.

Figure 12:
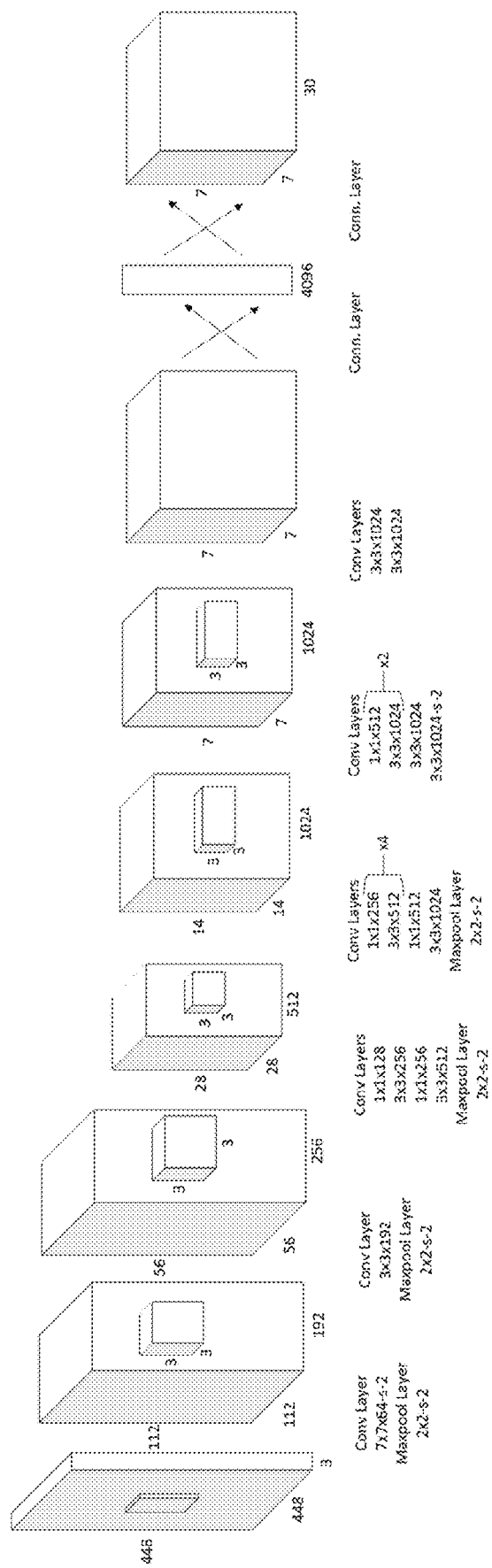
FIG. 12 schematically illustrates a YOLO (You Only Look Once) architecture, according to certain embodiments.
Figure 13:
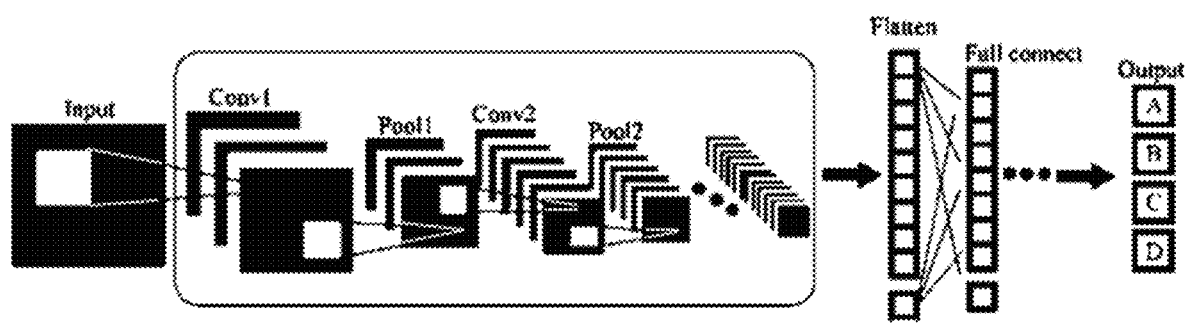
FIG. 13 illustrates a typical CNN (Convolutional Neural Network)'s architecture, according to certain embodiments.

In the presented case, YOLO uses 7×7 grids (8 shown in FIG. 12) with 2 bounded boxes and 12 classes discussed further below. YOLO's prediction hence contains a shape of (S,S,B×5+C=(7,7,2×5+12)=(7,7,22). Hence, YOLO builds a Convolutional Neural Network (CNN) that predicts a (7,7, 22) tensor, as illustrated in FIG. 12. The architecture utilizes a CNN network to reduce the spatiality to 7×7 with 1024 output channels at each location. The linear regression is performed using two fully connected layers that make 7×7×2 bounding box predictions. The final prediction is made where only the bounding boxes with high confidence scores are kept (>0.25). The network design is further shown in FIG. 11. A typical architecture of CNN is illustrated by FIG. 13.

The training phase creates a custom model as an iterative process that collects and organizes images while labelling the objects of interests such as holograms that become visible under angular illumination. In conjunction, the labelling also includes other landmarks such as logos, picture(s), barcodes, and other objects. The underlying principle is to train the AI model based on the extracted features of feeding images/videos, to learn certain image features such as color, spatiality, or edges to then identify these features when observing a similar set of features together in a test image whose authenticity is unknown.

The system was trained on a You-Only-Look-Once (YOLO) methodology variant known as YOLO.V5. YOLO.V5 belongs to a family of image detection methodologies that was pre-trained originally on the reCOgnition in Context (COCO) dataset. The dataset comprises of many common world objects containing a total of 350,000 images with 200 k labelled images with 80 object categories, 5 captions per image while including recognition in context.

In many embodiments, the aforementioned methodology extends its underlying principles to the identification of visible and hidden landmarks of an identity document by training YOLO.V5 models on labelled data to learn classes of objects in the data of identity documents. The overall training process starts with Dataset Creation that is consisted of two parts:

Image collection: A total of 850 RGB images of national identity documents were collected and labelled.

Label creation: Each image was labelled for a total of 12 classes, wherein each class of the 12 classes represents a distinct feature of the genre of the national identity document.

Then the process proceeds to Dataset Preparation, in which the dataset of labelled images is formatted according to the YOLO format, in which the labeling information is stored in a.txt file with the same name for each image file. These two files must be in the same directory. Each .txt file hence contains the labelling information (annotations) for the relevant/corresponding image file. This information comprises of the object class (e.g., logo, barcode, picture, etc.), and each object's bounding box information containing the object coordinates, height, and width as <object-class><x><y><width><height>, and each object information is entered on a new line.

Then the process proceeds to Custom Training: the training process continued while calculating the error loss during each epoch. The training process continues either until a set number of epochs (300 in this case) passed or the error increased for 5 turns.

The model backbone is pre-trained on an image classification dataset (ImageNet 1000 class competition dataset). The training process pre-trains the initial 20 of the 24 convolution layers leading to an average pooling and fully connected layer. Moreover, since overfitting can degrade a model's quality in terms of the model's ability to make a precise prediction on the authenticity of a broad range of target documents (of a document genre), data augmentation and dropout steps are added to prevent overfitting with a drop layer bearing a rate of 0.5 between first and second layers to avoid overfitting.

After pre-training is completed, a total of 850 images for each instance of the identity cards are captured and are fed into the YOLO network for further training. Each input image to the YOLO network is normalized by the 'batch_norm2d' layer carrying a running mean and variance of the pixel values passing through them. The network values are normalized as they pass from one layer to another. Moreover, regular normalization also is done at input where the pixel channel ranges from 0-255 are normalized between 0 and 1.

Moreover, in some embodiments, the following augmentation measures are undertaken during the training to mitigate the negative impact of overfitting:

Photometric distortion: This distortion induced various light-related distortions such as brightness, contrast, saturation, and noise as the following algorithm.

TABLE 2

Random Brightness Algorithm: changing the brightness of an input image randomly to provide a diversity in the images fed to the AI algorithm for training Input: Image $\gamma$
Output: Brightness-enhanced image $\gamma^b$
  If random_probability(0.2)
    Calculate $-0.1 \leq \Delta \leq 0.1$
    For each pixel value and channel
      px+= $\Delta$
    Return $\gamma^b$
  For each $\gamma^b$
    Perform Random Contrast adjustment
    Perform Random Hue adjustment
    Perform Random Saturation adjustment
    Perform Color conversion (RGB to HSV)
  Return $\gamma^b$ Geometric distortion: A distortion includes random scaling, cropping, flipping, and rotating of the input images.

Random erase: A distortion is used to randomly remove parts of the image to alter random pixel values based on the average kernel value of its neighborhood. This distortion effectively generates a type of regularization mechanism to prevent the model under training from overfitting by learning the features of the training data.

Planned Cut-out: This distortion conducts an organized cut-out of certain sections of the image while identifying the card boundaries using a pre-trained card detection algorithm. The technique is often used to increase the diversity of data especially at locations such as logos, pictures, or other distinct landmarks.

Tilt: Tilting input images randomly between angles ranging from 0, 90, 180, and 270 degrees.

Below are a few variations of the embodiment worth mentioning.

(A). In one embodiment, the photographing device such as a mobile phone or edge device where the illumination is based on a set of colored combination of illuminations to capture different illumination responses via a time-series machine learning algorithm. For example, a Samsung S2FE mobile device with an Android build and OpenCV-based angle estimation algorithm, a Jetson Xavier device with an Android build and OpenCV-based angle estimation algorithm.

(B). In another embodiment, an edge device with an automated angle adjustment mechanism to capture various angles or illumination with higher precision than a human-based, hand-held device. For example, a servo-based angle adjustment mechanism communicates with the angle outcomes from aforementioned Samsung S2FE mobile or Jetson Xavier device, so that the tilting angle mechanically set by the servo-based angle adjustment mechanism is directly associated with the captured images/videos, foregoing the need of computational estimation of the angle.

(C). In yet another embodiment, a CNN (Convolutional Neural Network) based holographic landmark identification mechanism (such as a YOLO.V5 based document identification algorithm at various angles) is used to verify documents that are scanned by a user or device in a pre-determined sequence.

(D). A time-series machine learning algorithm (e.g., CNN-LSTM ("Convolutional Neural Network-Long-Short Term Memory network) is used upon aforementioned (A). and (B). to capture a sequence of documents' angular illumination responses.

The provided method and/or system employs an angular illumination feedback mechanism to capture visible, holographic response from document surfaces of the otherwise invisible features such as logos, fonts, text, and pictures, uses an object detection method (e.g., YOLO or SSD (Single Shot Detect)) to identify the bounding boxes of key holographic features, and utilizes a semantic segmentation method (e.g., a UNet ("U" shape network) algorithm) to identify key holographic feature boundaries, and uses an automated angle adjustment mechanism (via a servo motor) moving the edge device or mobile phone based on the verification algorithm's successful verification at a certain angle.

These mechanism and methods, when used in full combination or partial combination, collectively offer advantages such as automation of detection of hidden, holographic features without relying on existing, more expensive hardware-based infrared or ultraviolet scanners, increased speed owing to the utilization of a machine learning algorithm where a single document can be scanned within milliseconds, and improved reliability and scalability of document verification by which document forgeries could be caught where part of embedded holographs is distorted because of document alteration, and enhanced accuracy in document verification by which the mechanically driven angle adjustment mechanism (such as aforementioned servo motor) that can precisely move the mobile phone or edge device (or the target documents) to various tilting angles to match against the tilting angles in the sample dataset used to train the AI models.

Additional Embodiment Details

The present invention may be a system, a method, and/or a computer program product. The computer program product and the system may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device or a computer cloud via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages, and scripting programming languages, such as Perl, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Notes

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain embodiments of this invention are described herein, including the best mode known to the inventors for carrying out the invention. It should be understood that the illustrated embodiments are exemplary only, and should not be taken as limiting the scope of the invention.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

What is claimed is:

1. A computer-implemented method of authenticating documents, comprising:

capturing, sequentially at a first set of placement angles that are different from each other, a first set of photo images of one or more security features of a known authentic document that is placed under an illumination condition, and wherein the one or more security features, when illuminated, are visible, partially or fully, at the first set of placement angles;

for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images;

training a computer vision algorithm to learn and model a set of document's angular responses of a document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features;

capturing, sequentially at a second set of placement angles that are different from each other a second set of photo images of a security feature of a first unknown document that is placed under the illumination condition, and wherein the first unknown document is of the document genre and whose authenticity is to be determined;

for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; and determining the authenticity of the first unknown document by applying the learned model on the second set of photo images and the second set of estimated angles, wherein the applying the model at least involves comparing a piece of descriptive information about the security feature of the first unknown document that is encoded in the learned model as a part of the set of document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

2. The method according to claim 1, wherein the at least one piece of descriptive information about each security feature of the one or more security features is a set of key boundaries of the one or more security features.

3. The method according to claim 1, wherein the training step further comprises at least one augmentation measure that manipulates images in the first set of photo images to improve the quality of the training, wherein the at least one augmentation measure is photometric distortion, geometric distortion, random erase, planned cut-out, or random tilt.

4. The method according to claim 1, wherein each of the two capturing steps captures its respective set of photo images on its respective document in a predetermined sequence, wherein the predetermined sequence defines an order in which the respective document is photographed to produce the respective set of photo images.

5. The method according to claim 1, further comprises:
capturing, sequentially at a third set of placement angles which are different from each other, a third set of photo images of a security feature of a second unknown document that is placed under the illumination condition, wherein the second unknown document is of the document genre and whose authenticity is to be determined;

for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images;

determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

6. A computer-implemented method of authenticating documents, comprising:
capturing, sequentially at a first set of placement angles that are different from each other, a first set of photo images of one or more security features of a known authentic document that is placed under an illumination condition, wherein the known authentic document is of a document genre, and wherein the one or more security features, when illuminated, are visible, partially or fully, at the first set of placement angles;

for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images;

training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features;

capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to values of the first set of estimated angles;

storing the second set of placement angles along with and in association with the second set of photo images; and determining the authenticity of the first unknown document by applying the learned model on the second set of images and the second set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

7. The method according to claim 6, wherein the at least one piece of descriptive information about each security feature of the one or more security features is a set of key boundaries of the one or more security features.

8. The method according to claim 6, wherein the training step further comprises at least one augmentation measure that manipulates images in the first set of photo images to improve the quality of the training, wherein the at least one augmentation measure is photometric distortion, geometric distortion, random erase, planned cut-out, or random tilt.

9. The method according to claim 6, wherein each of the two capturing steps captures its respective set of photo images on its respective document in a predetermined sequence, wherein the predetermined sequence defines an order in which the respective document is photographed to produce the respective set of photo images.

10. The method according to claim 6, further comprises:

capturing, sequentially at a third set of placement angles which are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles;

storing the third set of placement angles along with and in association with the third set of photo images; and determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

11. A computer-implemented method of authenticating documents, comprising:

retrieving, from a database, a first set of photo images of one or more security features of one or more known authentic documents of a document genre, wherein the first set of photo images are pre-captured, sequentially at a first set of placement angles that are different from each other, on the one or more security features of the one or more known authentic documents that are placed under an illumination condition, wherein the one or more security features, when illuminated, are visible, partially or fully, at the first set of placement angles;

for each of the first set of photo images, estimating, by using a computer-implemented machine learning algorithm, an angle of the one or more known authentic documents being held when the photo image was captured, and aggregating the estimated angle in association with the photo image of the first set of photo images into a first set of estimated angles, and storing the first set of estimated angles along with the first set of photo images;

training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contain the at least one piece of descriptive information about each security feature of the one or more security features;

capturing, sequentially at a second set of placement angles that are different from each other, a second set of photo images of a security feature of a first unknown document that is placed under the illumination condition, wherein the first unknown document is of the document genre and whose authenticity is to be determined;

for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; and determining the authenticity of the first unknown document by applying the learned model on the second set of images and the second set of estimated angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

12. The method according to claim 11, wherein the at least one piece of descriptive information about each security feature of the one or more security features is a set of key boundaries of the security feature.

13. The method according to claim 11, wherein the training step further comprises at least one augmentation measure that manipulates images in the first set of photo images to improve the quality of the training, wherein the at least one augmentation measure is photometric distortion, geometric distortion, random erase, planned cut-out, or random tilt.

14. The method according to claim 11, wherein the capturing step captures the second set of photo images on the first unknown document in a predetermined sequence, wherein the predetermined sequence defines an order in which the first unknown document is photographed to produce the second set of photo images.

15. The method according to claim 11, further comprises:
capturing, sequentially at a third set of placement angles that are different from each other, a third set of photo images of a security feature of a second unknown document, wherein the second unknown document is of the document genre and whose authenticity is to be determined, and wherein the security feature of the second unknown document is illuminated under the illumination condition;
for each of the third set of photo images, estimating, by using the computer-implemented machine learning algorithm, an angle of the second unknown document being held at the time when the photo image was captured, and aggregating the angle in association with the photo image of the third set of photo images into a third set of estimated angles, and storing the third set of estimated angles along with the third set of photo images; and
determining the authenticity of the second unknown document by applying the learned model on the third set of images and the third set of estimated angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of estimated angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

16. A computer-implemented method of authenticating documents, comprising:
retrieving, from a database, a first set of photo images of one or more security features of one or more known authentic documents of a document genre, wherein the first set of photo images are pre-captured, sequentially at a first set of placement angles that are different from each other, on the one or more security features of the one or more known authentic documents that were placed under an illumination condition, wherein the one or more security features, when illuminated, are visible, partially or fully, under the illumination condition;
for each of the first set of photo images, estimating, by using a computer-implemented machine learning algorithm, an angle of the one or more known authentic documents being held when the photo image was captured, and aggregating the angle in association with the photo image of the first set of photo images into a first set of estimated angles, and storing the first set of estimation angles along with the first set of photo images;
training a computer vision algorithm to learn and model a set of document's angular responses of the document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of a document type under the illumination condition that contains the at least one piece of descriptive information about each security feature of the one or more security features;
capturing, sequentially at a second set of placement angles that are different from each other, a second set of photo images of a security feature of a first unknown document that is placed under the illumination condition, wherein the first unknown document is of the document genre and whose authenticity is to be determined, and wherein the second set of placement angles are mechanically secured, by an automated angle adjustment means, to be equal to values of the first set of estimated angles;
storing the second set of placement angles along with and in association with the second set of photo images; and
determining the authenticity of the first unknown document by applying the learned model on the second set of images and the second set of placement angles, wherein the applying the model at least involves comparing a piece of descriptive information about the security feature of the first unknown document that is encoded in the learned model as a part of the document's angular responses of the document genre under the illumination condition, with a piece of information about the security feature of the first unknown document extracted from the second set of the photo images and the second set of placement angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

17. The method according to claim 16, wherein the at least one piece of descriptive information about each security feature of the one or more security features of the one or more known authentic documents is a set of key boundaries of the security feature.

18. The method according to claim 16, wherein the training step further comprises at least one augmentation measure that manipulates images in the first set of photo images to improve the quality of the training, wherein the at least one augmentation measure is photometric distortion, geometric distortion, random erase, planned cut-out, or random tilt.

19. The method according to claim 16, wherein the capturing step captures the second set of photo images on the first unknown document in a predetermined sequence, wherein the predetermined sequence defines an order in which the first unknown document is photographed to produce the second set of photo images.

20. The method according to claim 16, further comprises:
capturing, sequentially at a third set of placement angles that are different from each other, a third set of photo images of a security feature of a second unknown document that is placed under the illumination condition, wherein the second unknown document is of the document genre and whose authenticity is to be determined, and wherein the third set of placement angles are mechanically secured, by an automated angle adjustment means, to be equal to the values of the first set of estimated angles;
storing the third set of placement angles along with and in association with the third set of photo images; and
determining the authenticity of the second unknown document by applying the learned model on the third set of photo images and the third set of placement angles, wherein the applying the model at least involves comparing a piece of descriptive information about the security feature of the second unknown document that is encoded in the learned model as a part of the document's angular responses of the document genre under the illumination condition, with a piece of information about the security feature of the second unknown document extracted from the third set of the photo images and the third set of placement angles, wherein the comparing step produces a second confidence value, and if the second confidence value is below the pre-determined confidence threshold, the second unknown document is determined to be unauthentic, otherwise the second unknown document is determined to be authentic with regard to the security feature of the second unknown document.

21. A system for authenticating one or more documents, comprising:
one or more light sources providing an illumination condition, one or more output devices providing intermediate or final outcome of the authenticating documents and prompting end-user instructions for operating the system, a photographing device taking photo images of the one or more documents under the illumination condition, one or more computer processors, one or more computer-readable memories and one or more computer-readable, tangible storage devices, one or more databases, and computer readable program instructions, stored in at least one of the one or more computer-readable, tangible storage devices for execution by at least one of the one or more computer processors via at least one of the one or more memories, to perform operations, the operations comprising:
capturing, sequentially at a first set of placement angles that are different from each other, a first set of photo images of one or more security features of a known authentic document that is placed under an illumination condition, and wherein the one or more security features, when illuminated, are visible, partially or fully, at the first set of placement angles;
for each of the first set of photo images, estimating, by using a computer-implemented machine learning algorithm, an angle of the known authentic document being held at the time when the photo image was captured, and aggregating the angle in association with the photo image of the first set of photo images into a first set of estimated angles, and storing the first set of estimated angles along with the first set of photo images;
training a computer vision algorithm to learn and model a set of document's angular responses of a document genre under the illumination condition based on the first set of photo images and the first set of estimated angles, wherein the training deduces at least one piece of descriptive information about each security feature of the one or more security features based on the first set of photo images and the first set of estimated angles, and produces a learned model encoded with the set of document's angular responses of the document genre under the illumination condition that contains the at least one piece of descriptive information about each security feature of the one or more security features;
capturing, sequentially at a second set of placement angles that are different from each other a second set of photo images of a security feature of a first unknown document that is placed under the illumination condition, and wherein the first unknown document is of the document genre and whose authenticity is to be determined;
for each of the second set of photo images, estimating, by using the computer-implemented machine learning algorithm, an angle of the first unknown document being held at the time when the photo image was captured, and aggregating the angle in association with the photo image of the second set of photo images into a second set of estimated angles, and storing the second set of estimated angles along with the second set of photo images; and
determining the authenticity of the first unknown document by applying the learned model on the second set of photo images and the second set of estimated angles, wherein the applying the model at least involves comparing a piece of descriptive information about the security feature of the first unknown document that is encoded in the learned model as a part of the set of document's angular responses of the document genre under the illumination condition, with a piece of information about the security feature of the first unknown document extracted from the second set of the photo images and the second set of estimated angles, wherein the comparing step produces a first confidence value, and if the first confidence value is below a pre-determined confidence threshold, the first unknown document is determined to be unauthentic, otherwise the first unknown document is determined to be authentic with regard to the security feature of the first unknown document.

* * * * *